(12) United States Patent
Kubota et al.

(10) Patent No.: US 7,470,130 B2
(45) Date of Patent: Dec. 30, 2008

(54) JUNCTION BOX HAVING COMPONENTS COMBINED TO AN INNER COVER

(75) Inventors: Katsuhiro Kubota, Shizuoka (JP);
Masaoki Yoshida, Shizuoka (JP);
Yasuhiro Hara, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/565,784

(22) PCT Filed: Jul. 22, 2004

(86) PCT No.: PCT/JP2004/010777

§ 371 (c)(1),
(2), (4) Date: Jan. 25, 2006

(87) PCT Pub. No.: WO2005/013449

PCT Pub. Date: Feb. 10, 2005

(65) Prior Publication Data

US 2006/0211300 A1 Sep. 21, 2006

(30) Foreign Application Priority Data

| Jul. 31, 2003 | (JP) | ............................. 2003-204377 |
| Jul. 31, 2003 | (JP) | ............................. 2003-204378 |
| Jul. 31, 2003 | (JP) | ............................. 2003-204379 |
| Sep. 5, 2003 | (JP) | ............................. 2003-313874 |

(51) Int. Cl.
*H01R 12/00* (2006.01)
(52) U.S. Cl. ...................... 439/76.1; 439/76.2; 439/949
(58) Field of Classification Search ................ 439/76.1, 439/76.2, 949, 717
See application file for complete search history.

(56) References Cited

U.S. PATENT DOCUMENTS 6,375,517 B1 * 4/2002 Okabe et al. ................. 439/701

(Continued)

FOREIGN PATENT DOCUMENTS

EP 1 180 818 A2 2/2002

(Continued)

OTHER PUBLICATIONS

Communication from the Chinese Patent Office mailed May 9, 2008 with English translation (8 pages).

*Primary Examiner*—Tho D Ta
(74) *Attorney, Agent, or Firm*—Kratz, Quintos & Hanson, LLP

(57) ABSTRACT

A junction block, in which the total structure and circuit connection structure are compact and highly dense, respectively, is provided. A junction block 1 includes: an inner cover 2; connector blocks 3, 4 and a power block 5 disposed outside the inner cover; and busbars 49 and wiring module disposed being piled up within a space surrounded by the connector blocks and the power block, wherein terminals 8*b* of the connector blocks, terminals 89 of the power block and terminals 49*b*, 49*c* of the busbars are connected to the wiring module. The wiring module consists of a random wiring module 52 and a cross wiring module 56. The terminals 8*b*, 49*c*, 89 are connected to ends of the wiring modules 52, 56 and part of the terminals 49*b* of the busbars 49 are connected to a middle part of the random wiring module 52 situated as a lower layer in the space. The terminals 8*b*, 89 are arranged in a plurality of steps, wherein the terminals arranged in a lower step are connected to a narrow lower wiring module 52 while the terminals arranged in an upper step are connected to a wide upper wiring module 56.

16 Claims, 19 Drawing Sheets

U.S. PATENT DOCUMENTS 6,430,054 B1 * 8/2002 Iwata .......................... 361/752
6,597,578 B2 * 7/2003 Shiina et al. ................ 361/728
6,670,548 B2 * 12/2003 Sumida et al. ............... 174/50
6,677,521 B2 * 1/2004 Sumida et al. ............. 439/76.2

FOREIGN PATENT DOCUMENTS

EP 1 201 505 5/2002

* cited by examiner

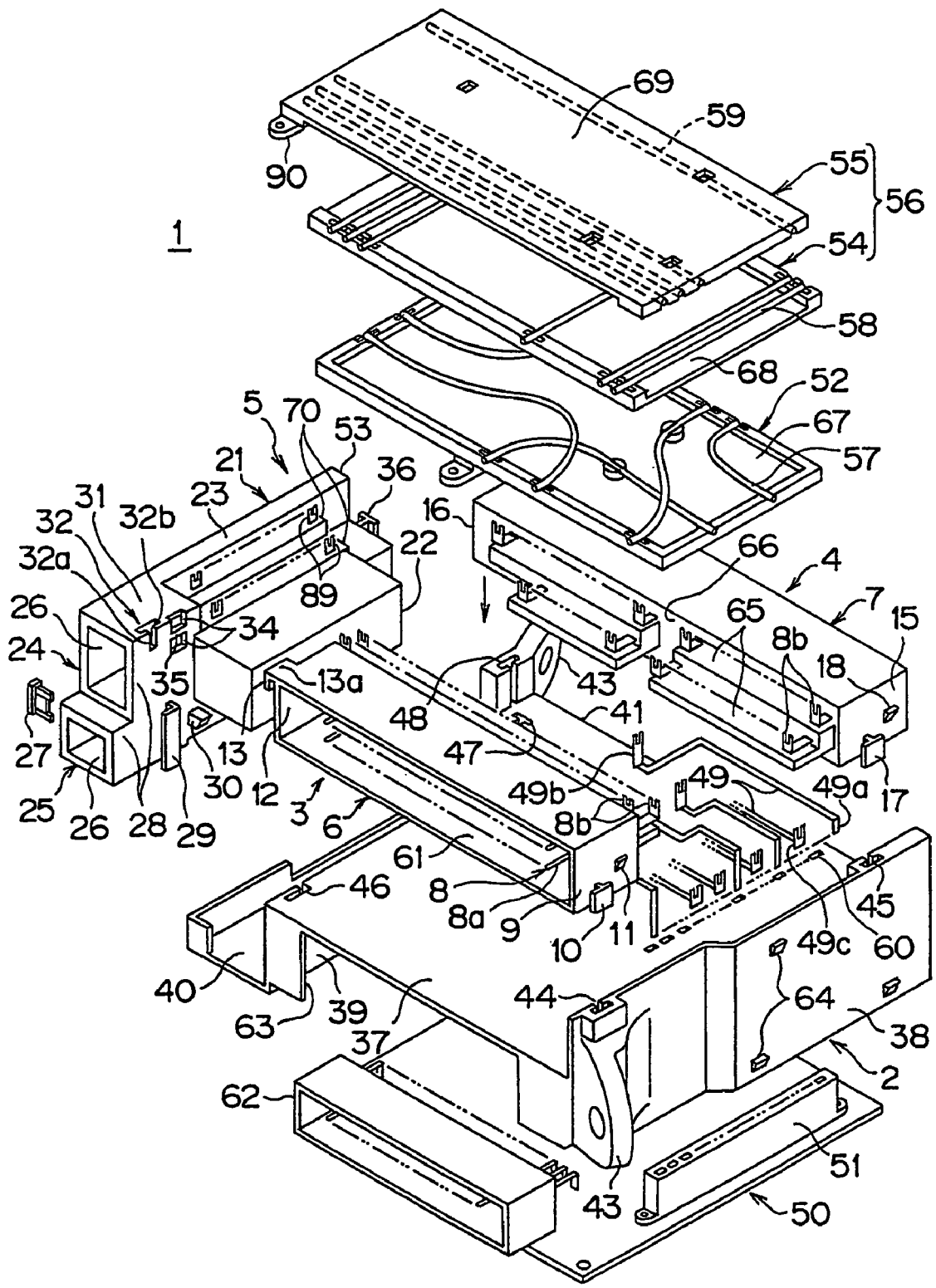
F I G. 1

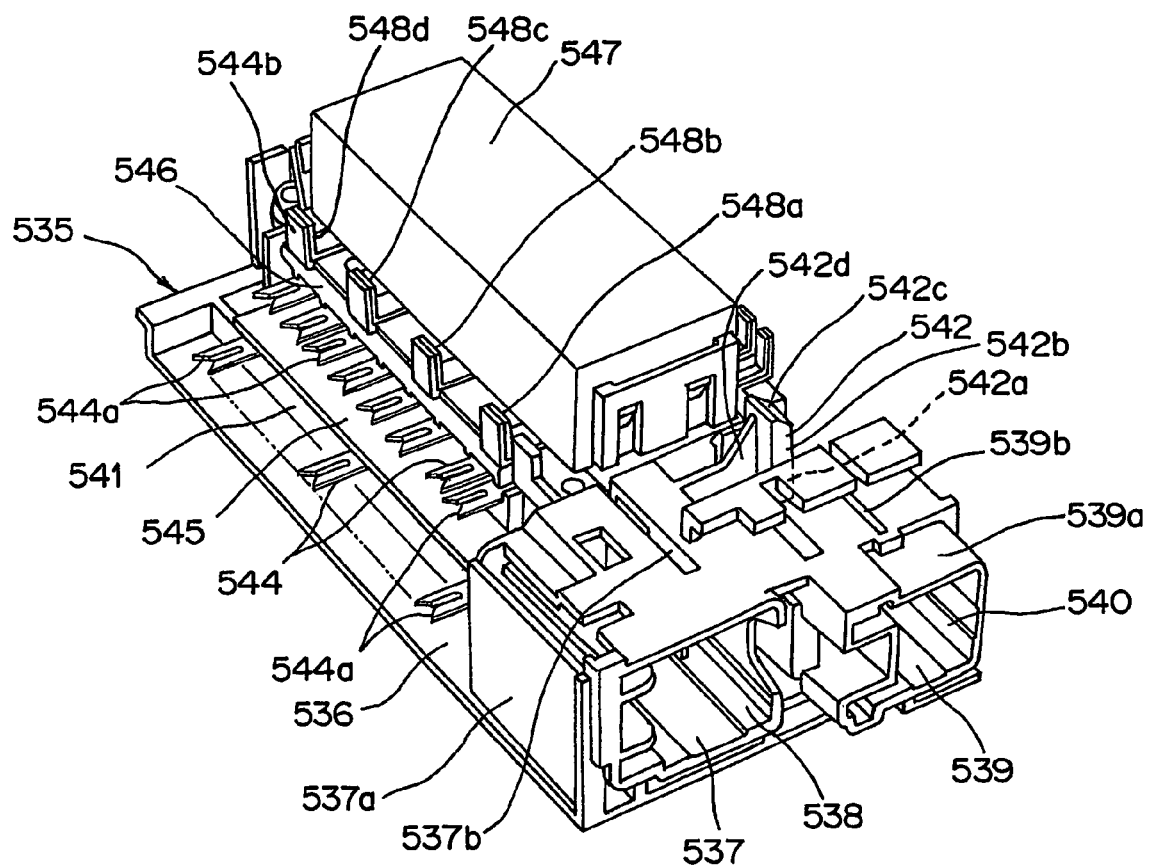
F I G. 21

JUNCTION BOX HAVING COMPONENTS COMBINED TO AN INNER COVER

TECHNICAL FIELD

The present invention relates to a junction block, in which constitutional components such as connector blocks, a fuse block and a wiring module are combined to an inner cover.

BACKGROUND ART

FIG. 23 shows an example of a conventional junction block (for example, referring to Japanese Patent Application Laid-Open No. H11-27829, particularly page 3 and FIG. 2 thereof).

The junction block 71 includes components such as a wiring board 75, busbar circuit 76 board, printed circuit board 77, connectors 78, 79, fuse mount 80 and relay mount 81 are received in a box-shaped electric junction box body formed with a upper cover 72, middle cover 73 and lower cover 74, these covers being made of synthetic resin.

As for the wiring board 75, a plurality of electric wires 82 are arranged on an electrically insulating board and the wires 82 are connected to pressure welding parts of corresponding L-shaped terminals 83. Each tab-shaped electric contact of the L-shaped terminal 83 protrudes in a connector housing so as to form the connector 78.

As for the busbar circuit board 76, a plurality of busbars 84 are arranged on an electrically insulating board and terminals of the respective busbars 84 are located within the fuse mount 80. The printed circuit board 77 has a printed circuit having a required shape on an insulating board and is connected to the wiring board 75 by a long terminal 85. A L-shaped terminal 86 connected to the printed circuit board 77 protrudes in the connector 79. The connectors 78, 79 and fuse mount 80 protrude from the middle cover 73 toward the outside. The printed circuit board 77 is fixed to the middle cover 73 or lower cover 74 by a mounting board 87 and screw 88.

However, in the conventional structure described above, since the components such as the wiring board 75, circuit boards 76 and 77, connectors 78 and 79, fuse mount 80 and relay mount 81 are received in a space formed being surrounded by the respective covers 72-74, therefore a dead space is easily formed, causing a problem that the junction block 71 is forced to increase its size or causing difficulty in achieving high density circuit connection.

Further, in order to electrically connect the components such as the wiring board 75, circuit boards 76 and 77, connectors 78 and 79, fuse mount 80 and relay mount 81 to one another, time-consuming connecting means such as soldering is required, causing a problem of increase in the assembling man-hour or assembling cost. Furthermore, since the constitutional components such as connectors 78 and 79 and fuse mount 80 are fixed to an middle cover 73 with a screw or the like, therefore the workability of the assembling is not good, and since a space is needed to fix the components causing a problem that the junction block 71 is forced to increase its size. Further, in a case that the connectors 78, 79 and fuse mount 80 are large (laterally long), the fixing strength of the middle cover 73 and the whole stiffness tends to be deteriorated.

DISCLOSURE OF THE INVENTION

It is an objective of the present invention to solve the above problems and to provide a junction block, in which the total structure can be compact and/or the circuit connection structure can be highly dense, and by which the assembly can be easily effectively carried out and/or the stiffness of the assembled structure can be improved.

In order to attain the objective described above, a junction block according to the present invention described in claim 1 is a junction block including:

an inner cover;

connector blocks and a power block disposed outside the inner cover; and busbars and a wiring module disposed being piled up within a space surrounded by the connector blocks and the power block, wherein terminals of the connector blocks, terminals of the power block and terminals of the busbars are connected to the wiring module.

With the construction described above, the connector blocks and the power block are constituted as the outside part, i.e. as a circumferential wall of the junction block, so that the busbars and the wiring module can be appropriately disposed in the space surrounded by the connector blocks and the power block in a space-saving manner. The inner cover acts as a base for mounting the components such as the connector blocks, power block, busbars and wiring module. The terminals of the connector blocks, terminals of the power block and terminals of the busbars are connected to the wiring module. Thus, the connector blocks, power block, busbars (other components continuing to the busbars as well) and the wiring module are connected to one another.

A junction block according to the present invention described in claim 2 is characterized in that regarding the junction block according to claim 1, the wiring module consists of a random wiring module and a cross wiring module.

With the construction described above, a plurality of electric wires are randomly arranged in a required shape on the random wiring module, while a plurality of electric wires are arranged crossing one another at right angles on the cross wiring module. Preferably, the wires extending in each direction on the cross wiring module may be cut at a required position and may be connected (e.g. welded) to one another at a required position. Thus, the random wiring is mixed with the cross wiring so as to enable various designing for a circuit form.

A junction block according to the present invention described in claim 3 is characterized in that regarding the junction block according to claim 2, the terminals are connected to ends of the wiring modules and part of the terminals of the busbars are connected to a middle part of the random wiring module situated as a lower layer in the space.

With the construction described above, the terminals are connected to the corresponding wires at the ends of the wiring modules and part of the terminals of the busbars are connected to the corresponding wires at a middle part of the random wiring module situated as a lower layer in the space, thereby increasing the degree of freedom for the connecting positions of the terminals to the wires.

A junction block according to the present invention described in claim 4 is characterized in that regarding the junction block as claimed in any one of claims 1-3, the terminals of the connector blocks and/or the terminals of the power block are arranged in a plurality of steps, wherein the terminals arranged in a lower step are connected to a narrow lower wiring module while the terminals arranged in an upper step are connected to a wide upper wiring module.

With the construction described above, the terminals arranged in a lower step are situated protruding long in the width direction of the wiring module while the terminals arranged in an upper step are situated protruding short in the same direction, thereby the terminals arranged in lower and upper steps are situated stepwise, the terminals arranged in a lower step are connected to an end of a narrow lower wiring module while the terminals arranged in an upper step are connected to an end of a wide upper wiring module, thereby the ends of the respective wiring modules are situated stepwise, so that the respective wiring modules are piled up and connected to the corresponding wires efficiently with good workability and a space required for the connecting parts can be saved.

A junction block according to the present invention described in claim 5 is characterized in that regarding the junction block as claimed in any one of claims 1-4, the terminals of the connector blocks and/or the terminals of the power block and/or the terminals of the busbars are pressure welding terminals.

With the construction described above, the wires of the wiring module can be connected to the pressure welding terminals easily efficiently in a space-saving manner.

A junction block according to the present invention described in claim 6 is characterized in that regarding the junction block as claimed in any one of claims 1-5, the power block includes fuses outside and a relay inside.

With the construction described above, a plurality of small fuses are arranged outside, thereby making the maintenance easy. A large relay is situated, for example, in a space surrounded by the power block and the connector blocks on the inner cover, thereby enabling to use the inside space effectively.

A junction block according to the present invention described in claim 7 is characterized in that regarding the junction block as claimed in any one of claims 1-6, an electronic unit is mounted on the back of the inner cover and connected to terminals arranged on the back of the busbars.

With the construction described above, the electronic unit is connected to the busbars and the electronic unit is connected to the wiring module, connector blocks and power block through the busbars. The electronic unit is situated on the reverse side with respect to the connector blocks and wiring module through the inner cover.

A junction block according to the present invention described in claim 8 is characterized in that regarding the junction block as claimed in any one of claims 1-7, the inner cover, the connector blocks and the power block are slidingly combined.

With the construction described above, the connector blocks and the power block can be easily assembled to the inner cover, for example, from the above (i.e. in one direction) in a slide-fitting manner. Therefore, the connector blocks and the power block can be tightly combined with each other relatively to the inner cover without a gap or with a very small gap.

In order to attain the objective described above, a junction block according to the present invention described in claim 9 is a junction block including:

an inner cover; and a power block and connector blocks combined with the inner cover, wherein components such as circuit boards are disposed and connected within a space surrounded by the power block and the connector blocks, wherein the power block and the connector blocks form the outside of the junction block.

With the construction described above, the power block and the connector blocks form the circumferential wall of the junction block. Each constitutional component such as the power block, connector block or circuit board is not needed to be received in a box-shaped cover like a conventional junction block (i.e. conventional junction box). Each component can be assembled to the outside of the inner cover, as a unit having a building block-shape, for example.

A junction block according to the present invention described in claim 10 is characterized in that regarding the junction block according to claim 9, the combination of the power block and the connector blocks with the inner cover is carried out by engaging a slide-engaging part with a guide part in a direction crossing the inner cover at right angles.

With the construction described above, the power block and the connector blocks are slidingly assembled to the inner cover from above vertically, for example. The slide-engaging part slidingly engages with the guide part. The slide-engaging part and the guide part may be formed on any one of the inner cover, power block and connector block. The guide part is formed in a thick part of the wall and the slide-engaging part is completely received in the wall, thereby respective components adhere to one another without forming a practical gap, making the structure of the junction block in a space-saving manner.

A junction block according to the present invention described in claim 11 is characterized in that regarding the junction block according to claim 9 or 10, one of the connector blocks is combined with the inner cover, while the other connector block is combined with the power block.

With the construction described above, first the power block is combined with the inner cover in advance, then the connector blocks are combined with both the inner cover and the power block, thereby the inner cover and the power block are combined and fixed to each other through the connector blocks, improving the strength of the assembled structure.

A junction block according to the present invention described in claim 12 is characterized in that regarding the junction block as claimed in any one of claims 9-11, the slide-engaging part of the connector block or the power block enters into a dead space in the power block or the connector block.

With the construction described above, the slide-engaging part enters into the dead space and the dead space is effectively used for the combination, thereby the structure of the combined part can be made in a space-saving manner. The guide part corresponding to the slide-engaging part communicates with the dead space. The connector blocks adhere to the power block without a practical gap.

A junction block according to the present invention described in claim 13 is characterized in that regarding the junction block according to claim 12, the dead space is within a connector.

With the construction described above, for example, a dead space situated on the side of the engaging portion of a connector of the power block is effectively used as a space for the combination. The connector may be a connector within the connector block. The connector block integrally includes a plurality of connectors.

A junction block according to the present invention described in claim 14 is characterized in that regarding the junction block according to claim 12 or 13, the slide-engaging part that enters into the dead space consists of a rib and an outside wall that covers an end and the front of the rib.

With the construction described above, the outside wall of the slide-engaging part is reinforced with the rib so as to improve the engaging force with respect to the guide part. The outside wall covers the guide part into which the rib enters so as to prevent dust from entering into the connector.

A junction block according to the present invention described in claim 15 is characterized in that regarding the junction block as claimed in any one of claims 9-14, the combination of the power block and the connector blocks with the inner cover is carried out in the vicinity of a mount of the inner cover.

With the construction described above, the combination of the respective components is carried out in the vicinity of the mount, which is for fixing the junction block to a vehicle body or the like, thereby improving the strength of the assembled structure of the junction block.

BRIEF DESCRIPTION OF THE DRAWINGS

FIG. 1 is an exploded perspective view illustrating a preferred embodiment of a junction block according to the present invention.

FIG. 21 is a perspective view illustrating an electric source block (electric component) to be assembled to an inner cover (main body) of the junction box.

BEST MODE FOR CARRYING OUT THE INVENTION

Figure 2:
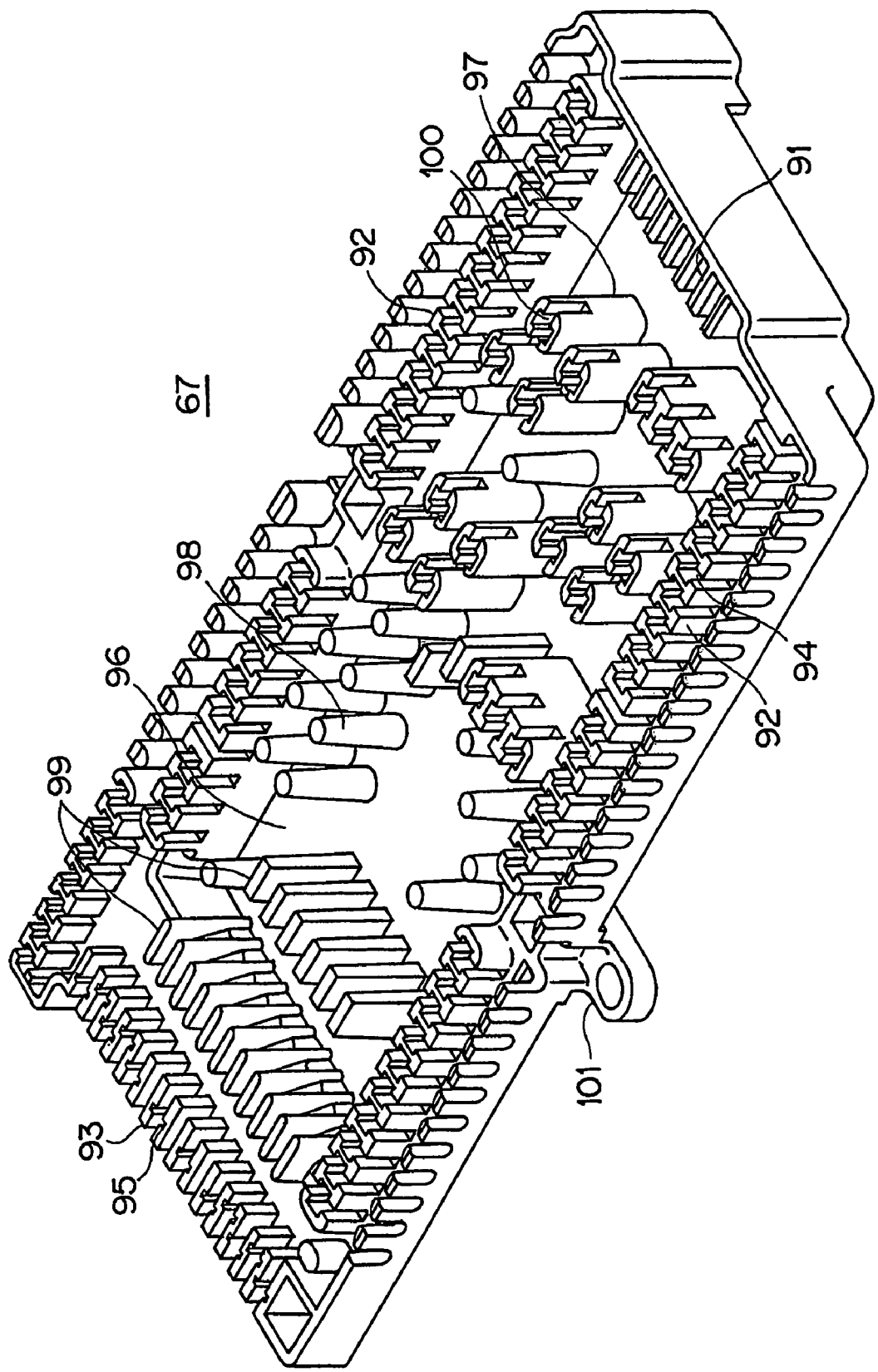
FIG. 2 is a perspective view illustrating a preferred embodiment of a wiring board constituting a random wiring module as a constitutional component of the junction block.

In the following, the preferred embodiments of the present invention will be explained in detail with reference to the attached drawings.

FIG. 1 shows a preferred embodiment of a junction block according to the present invention.

The junction block 1 includes: an inner cover 2 made, of synthetic resin; a pair of connector blocks 3, 4 situated right and left to be slidingly engaged with and fixed to the inner cover 2 from above; a power block 5 situated on one side to be slidingly engaged with and fixed to the inner cover 2 from above; a plurality of busbars 49 mounted on the inner cover 2 between both connector blocks 3, 4; and a random wiring module (wiring module) 52 and a cross wiring module (wiring module) 56 both to be piled on the inner cover 2 from above between both connector blocks 3, 4 and to be connected to the connector blocks 3, 4, power block 5 and busbars 49.

Each connector block 3, 4 includes a housing 6, 7 made of synthetic resin and terminals 8 horizontally penetrating through the housing 6, 7. Each housing 6, 7 includes a connector-fitting chamber 61 that is opened on the front side thereof and horizontal seats 65 formed in two steps (stepwise) up and down on the back side thereof, wherein one part of each terminal 8 projectingly situated within the connector-fitting chamber 61 as a male electric contact 8a having a pin-shape or tab-shape while an opposite part of the terminal 8 is formed standing up vertically from each seat 65 as a pressure welding part (terminal) 8b. The seat 65 protrudes backward from a vertical base wall 66 of each housing 6, 7. The base wall 66 of the housing 6 faces to the base wall 66 of the housing 7. The pressure welding part 8b of the housing 6 faces to the pressure welding part 8b of the housing 7.

The pressure welding part 8b includes a pair of pressure welding pieces and a slot between the pressure welding pieces, wherein a blade part located on the inlet side of the slot cuts an insulating coating of an electric wire and an inner end surface of each pressure, welding piece strongly comes in contact with a conductor part (i.e. core wire) of an electric wire. This situation is the same as that of a pressure welding terminal. (The pressure welding part means the pressure welding terminal.)

The electric contacts 8a are situated in two steps up and down, while the pressure welding parts 8b are situated being shifted upward or downward and left or right. Each upper pressure welding part 8b is situated being separated from the base wall 66 by a short horizontal distance while each lower pressure welding part 8b is situated being separated from the base wall 66 by a long horizontal distance. The upper electric contact 8a continues to the upper pressure welding part 8b while the lower electric contact 8a continues to the lower pressure welding part 8b.

Each lower pressure welding part 8b of the connector blocks 3, 4 is pressure-welding connected to an end situated left or right of an electric wire 57 after penetrating through an end situated left or right of the wiring board 67 of the random wiring module 57 situated on the lower side (i.e. the first layer), while each upper pressure welding part 8b of the connector blocks 3, 4 is pressure-welding connected to an end situated left or right of an electric wire 58 after penetrating through an end situated left or right of the wiring board 54 (the second layer for wiring in X-direction) of the cross wiring module 56 situated on the upper side.

A plurality of electric wires 57 having an insulating coating are randomly (i.e. in a required shape) arranged on a surface of the wiring board 67 made of synthetic resin, thereby the random wiring module 52 is constituted. The cross wiring module 56 consists of a wiring board 54 (a lower layer for wiring in X-direction) and a wiring board 55 (an upper layer for wiring in Y-direction), wherein each wiring board 54, 55 includes a board 68, 69 and a plurality of electric wires 58, 59, the wire 58 crossing the wire 59 at right angles, that is, the wires 59 are straightly arranged on the upper board 69 in the back and forward direction (i.e. in Y-direction) while the wires 58 are straightly arranged on the lower board 68 in the left and right direction (i.e. in X-direction). Each wire 57 of the random wiring module 52 and each wire 58 of the lower wiring board 54 of the cross wiring module 56 are exposed upward, while each wire 59 of the upper wiring board 55 is exposed downward.

The first layer random wiring module 52 is formed long in the lateral direction, the second layer wiring board 54 of the cross wiring module 56 is formed wider and short than the random wiring module 52, and the third layer wiring board 55 is formed longer than the random wiring module 52 and narrower than the second layer wiring board 54.

A plurality of busbars 49 are arranged in a required shape on a base plate 37 of the inner cover 2, thereby a busbar circuit board is constituted. Busbar-receiving grooves (not shown in the figure) are formed on the base plate 37 in a required shape. Each busbar 49 is arranged in a manner that one end of each busbar 49 is arranged in a lateral line in the vicinity of a wall 38 of the rear end of the inner cover 2, wherein each busbar 49 extends in a require shape up to the middle of the base plate 37 along the base plate 37 starting from the one end of the busbar 49, wherein the position of the opposite end of each busbar 49 is set randomly.

The tab-shaped or pin-shaped male terminal 49*a* extending downward at an end of the busbar 49 is connected to a connector 51 of an electronic control circuit board (i.e. electronic unit) 50 situated on a lower side after penetrating through a hole 60, which is arranged in a line with the other holes on the base plate 37. The connector 51 receives a plurality of female terminals (not shown in the figure) situated in a line in its connector housing, wherein the female terminals are connected to a printed circuit (not shown in the figure) of the electronic control circuit board 50.

The pressure welding terminal (terminal) 49*c* extending upward at an end of the busbar 49 is pressure-welding connected to an electric wire 59 at a rear end of the wiring board 55 of the cross wiring module 56. The pressure welding terminal 49*b* extending upward at the opposite end of the busbar 49 is pressure-welding connected to an electric wire 59 at the middle in the longitudinal direction of a board 67 after penetrating through the board 67 of the random wiring module 52.

The boards 67-69 of the wiring modules 52, 56 can be piled up with a plurality of those according to a specification of the circuit. Each wiring modules 52, 56 is fixed to the inner cover 2 at a corresponding bracket thereof with a screw or the like.

A relay 22 is mounted on the back side of a base 23 of the power block 5. Seats 70 are formed on the base 23 in two steps up and down on the upper side of the relay 22. Pressure welding terminals (terminals) 89 are arranged in a line on the seats 70. The lower seat 70 is located on the back side (i.e. on the side of the relay 22) of the base 23, while the upper seat 70 is located near to the front of the base 23 (i.e. on the side of the fuse 27). Each pressure welding terminal is connected to a corresponding busbar (not shown in the figure) in the power block.

The lower pressure welding terminal 89 is pressure-welding connected to an electric wire 57 at a front end of the board 67 after penetrating through the board 67 of the random wiring module 52, while the upper pressure welding terminal 89 is pressure-welding connected to an electric wire 59 at a front end of the wiring board 55 of the upper cross wiring module 56.

A thin electrically insulating sheet (not shown in the figure) is provided between the wiring board 54 and the wiring board 55 of the cross wiring module 56. A wide and thin upper cover (not shown in the figure) made of synthetic resin is applied on the inner cover 2 from above the wiring board 55, wherein the upper cover covers and protects the connector blocks 3, 4, wiring modules 52, 56, and power block 5.

In the description described above, the directions such as front and rear, left and right, and up and down are the definition with supposing that the power block is situated in the front, that is, the definition of the directions is only for aiding an explanation and the definition may not agree with an actual setting direction of the junction block.

In FIG. 1, only one connector-fitting chamber 61 of the connector block 3 is illustrated. However, instead, a plurality of small connector-fitting chambers may be arranged in a line. In such a case, each connector-fitting chamber 61 may be fitted and connected to a corresponding connector of, for example, an external wiring harness.

Further, each connector block 3, 4 includes a male electric contact 8*a* in the preferred embodiment described above, however, instead, for example, a plurality of terminal-receiving chambers (not shown in the figure) may be arranged in parallel in two steps up and down in a housing, each terminal-receiving chamber may receive a female electric contact (not shown in the figure) therein, pressure welding parts 8*b* protruding outward, which continue to the female electric contact, may be arranged in two steps up and down. In such a case, the housing is fitted to a connector that has a connector-fitting chamber on the side of a wiring harness.

The first connector block 3 includes: a slide-engaging part 10 having a T-shape in its lateral section and an engaging projection 11 having a triangle-shape in its longitudinal section on one side wall 9 of the housing 6; and a slide-engaging part 13 having a T-shape in its lateral section, the upper side and the front side of which are covered with a hood-shaped wall 13*a*, and an engaging projection (not shown in the figure) having a triangle-shape in its longitudinal section on the opposite side wall 12 of the housing 6. The slide-engaging part 10 is slidingly engaged with one side of the inner cover 2, while the other slide-engaging part 13 is slidingly engaged with the back side of the power block 5.

The second connector block 4 includes a slide-engaging part 17 having a T-shape in its lateral section and an engaging projection 18 having a triangle-shape in its longitudinal section on the side walls 15 and 16 situated right and left of the housing 7, respectively. The slide-engaging part 17 is slidingly engaged with one side of the inner cover 2, while the other slide-engaging part (not shown in the figure) is slidingly engaged with the other side of the inner cover 2.

In the power block 5, a relay (i.e. electric component) 22 is fixed to a fuse block 21 with an engaging means. The fuse block 21 includes: a base (i.e. fuse plate) 23 made of synthetic resin; connector housings 24, 25 integrally formed in two steps up and down on one side of the base 23; busbars (not shown in the figure) to be received in a plurality of steps in the base 23; pin-shaped or tab-shaped male terminals continuing to the busbars and protruding in the connector-fitting chamber 26 of the connector housings 24, 25 along with nipping terminals for connecting to the fuse; seats formed in two steps up and down (i.e. stepwise) on the base; pressure welding terminals continuing to the busbars and standing up from the respective seats being arranged in parallel; and a plurality of small (low) fuses 27.

The connector housings 24, 25 and the terminals constitute a connector (24, 25), wherein one connector is connected to an external power source, while the other connector is connected to a load.

A back wall 28 on the side of the lower connector housing 25 is provided with a slide-engaging part 29 having a L-shape in its lateral section and an engaging projection 30 both corresponding to the inner cover 2. The upper part of the back wall 28 and an upper wall 31 of the upper connector housing 24 are provided with an engaging hole (guide) 32 corresponding to the slide-engaging part 13 of the first connector block 3. The engaging hole 32 includes a hole 32a long in the longitudinal direction on the side of the back wall 28 and a hole 32b long in the lateral direction on the side of the upper wall 31. The hole 32 communicates with a dead space inside the connector housing 24 and the slide-engaging part 13 is received in the dead space.

Holes 34 or recesses 34 situated up and down are formed in the vicinity of the side of the engaging hole 32. There is formed an engaging wall 35 long in the lateral direction between the holes 34 or recesses 34. An engaging projection (not shown in the figure) of the first connector block 3 engages with the engaging wall 35 after climbing over it from above.

The other side end of the base 23 of the power block 5 is provided with a slide-engaging part 36 having a T-shape in its lateral section. Each slide-engaging part 29, 36 of the one and other side of the power block 5 slidingly engages with the inner cover 2 from above.

The inner cover 2 includes: a horizontal plate 37; a vertical wall 38 crossing the rear end of the base plate 37 at right angles continuing in the up and down direction; a vertical wall 39 crossing the front end of the base plate 37 at right angles continuing downward; a horizontal bottom wall 40 extending from the bottom end of the wall 39 crossing at right angles; a wall 41 extending on the right end of the base plate 37; and a vertical wall continuing to the wall 41 crossing at right angles the wall 41, wherein the vertical wall and the left end side of the vertical wall 38 siuated at the rear end, each is provided with a vertical bracket (i.e. mount) 43 for fixing to a vehicle body or the like, which vertical bracket 43 are integrally formed on a diagonal line. Each bracket 43 has a hole for inserting a bolt therethrough.

The left side of the vertical wall 38 at the rear end is provided with a vertical guide groove (guide part) 44 having a T-shape in its lateral section corresponding to the slide-engaging part 10 of the first connector block 3 and an engaging recess (not shown in the figure) corresponding to the engaging projection 11 adjacently to each other. Further, the right side of the vertical wall 38 is provided with a vertical guide groove (guide part) 45 having a T-shape in its lateral section corresponding to the slide-engaging part 17 of the second connector block 4 and an engaging recess (not shown in the figure) corresponding to the engaging projection 18 adjacently to each other. The left guide groove 44 is formed on a thick portion in the vicinity of the upper part of the bracket 43.

A fuse block 21 is mounted along the front wall 39 of the inner cover 2 and a relay 22 is situated on the base plate 37 between both connector blocks 3 and 4. The left side of the wall 39 is provided with a vertical guide groove (guide part) 46 having a L-shape in its lateral section corresponding to the one slide-engaging part 29 of the power block 5, while the right wall 41 is provided with a vertical guide groove (guide part) 47 having a T-shape in its lateral section corresponding to the other slide-engaging part 36 of the power block 5. Further, the wall in the vicinity of the bracket is provided with a vertical guide groove (guide part) 48 having a T-shape in its lateral section corresponding to a slide-engaging part (not shown in the figure) of the second connector block 4. The two guide grooves 47, 48 are provided in the vicinity of the bracket 43.

An electronic control circuit board (i.e. electronic unit) 50 is received under the base plate 37 of the inner cover 2. The electronic control circuit board 50 includes circuit boards each having a printed circuit and so on, connectors 51, 62 provided on the circuit board, and electronic components (not shown in the figure). The connector 51 extending upward continues to the upper busbars 49, while the connector 62 having the connector-fitting chamber opened on the side is connected to a connector of an external wiring harness and so on. The electronic control circuit board 50 is fixed to the inner cover 2 with a screw or the like.

A thin under cover (not shown in the figure) made of synthetic resin is provided with respect to the inner cover 2 from the lower side of the electronic control circuit board 50. The under cover protests the electronic control circuit board 50 from the outside. A sub-electronic control circuit board (not shown in the figure) may be mounted on the under cover.

In FIG. 1, after the power block 5 is combined with (i.e. mounted on) the side of the inner cover 2, then the connector blocks 3 and 4 are combined with the inner cover 2 and the power block 5. When the slide-engaging parts 10, 13, 29 engage with the respective guide grooves 44, 46 formed in the walls of the respective constitutional components and the connector 24, the power block 5 adheres to the inner cover 2 without a gap and therefore, the connector blocks 3, 4 adhere to the inner cover 2 and the power block 5 without a gap.

In a state that the connector blocks 3, 4 are fixed (i.e. mounted) to the front and rear of the inner cover 2 with combining means, the wiring modules 52, 56 are fixed (i.e. mounted) on the center part (busbar mount part) of the inner cover 2 with screws. Each wiring module 52, 56 is situated within a space formed between the connector blocks 3 and 4 in a space-saving manner. Further, the control circuit board 50 is fixed (i.e. mounted) on the back side of the inner cover 2 and the connector 62 is exposed outside from a notched opening 63 of the inner cover 2. Upper and lower thin covers (not shown in the figure) are mounted on the outside of the wiring modules 52, 56 and the control circuit board 50 together with the inner cover 2 and the connector blocks 3, 4. The upper and lower covers are engaged with an engaging projection 64 of the inner cover 2.

Thus, the power block 5, connector blocks 3, 4 and circuit board 50 are mounted on the inner cover 2 without a practical gap and in addition, the busbars 49 and a plurality layers of the wiring modules 52, 56 are received between the pair of the connector blocks 3 and 4, thereby a dead space within the junction block 1 is reduced, enabling to make the junction block 1 thin and small.

The shape of each slide-engaging part in the junction block 1 may be a L-shape, T-shape or cross-shape not at right angles such as a Y-shape in the lateral section. The guide hole (engaging hole) 32 of the power block 5 corresponding to the slide-engaging part 13 of the connector block 3 may be formed in a wall (i.e. a part, the inside of which being a dead space) of the base 21 that receives the fuses and busbars therein, besides in the wall of the connector 24.

Figure 3:
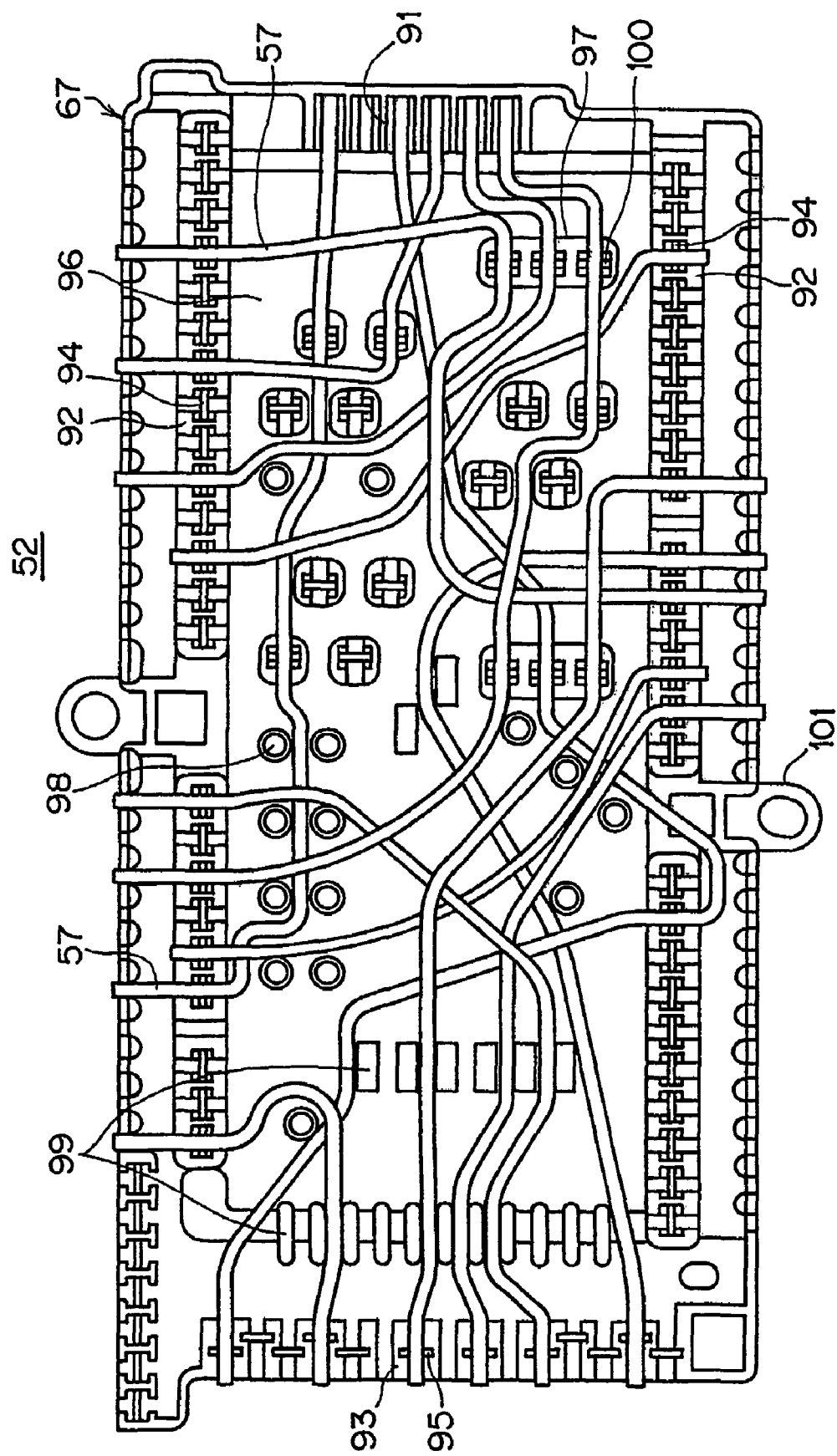
FIG. 3 is a plan view illustrating a preferred embodiment of a random wiring module.

FIG. 2 shows a preferred embodiment of the insulating wiring board 67 of the random wiring module 52. FIG. 3 shows a preferred embodiment of the random wiring module 52, in which a plurality of electric wires 57 are arranged in a required shape (i.e. random) on the wiring board 67.

In the wiring board 67, there are provided a plurality of wire-holding parts 91-93 in parallel with the same pitch along four edges situated front and rear, and left and right, wherein pressure welding terminal insertion through holes 94, 95 are provided on the wire-holding parts 92 (front edge) and 93 (left edge). Each wire-holding part 91-93 consists of a pair of nipping projections and the electric wire 57 is held by and fixed into a groove or slot formed between a pair of the nipping projections.

The inside part of the wiring board 67 surrounded by the electric wire-holding parts 91-93 from every direction is a low hollow part 96, in which wire-holding parts 97, each having a post-shape, wire-guiding parts 98, each having a pin-shape and wire-guiding parts 99, each having a rib-shape. The wire-holding part 97 consists of a pair of nipping projections formed from a bottom wall of the hollow part 96 and a pressure welding terminal insertion hole 100 formed between the pair. The wire-guiding part 98 consists of a cylinder having a pin-shape formed from the bottom wall. The wire-guiding part 99 consists of a rib formed in parallel from the bottom wall. A bracket 101 is formed protruding outward on the left and right edges of the wiring board 67.

As shown in FIG. 3, electric wires 57 are randomly (i.e. in a required shape) arranged on the wiring board 67. For example, an end of the wire 57 is press-fitting fixed to the wire-holding parts 91-93 situated left and right or front and rear, the wire 57 is hung and bent by the wire-guiding part 98 or, alternatively, the opposite end of the wire 57 is press-fitting fixed to the wire-holding parts 91-93 after passing through the wire-guiding part 99. Alternatively, the wire 57 passes through the wire-holding part 97 and then, is bent so that the opposite end of the wire 57 is press-fitting fixed to the wire-holding parts 91-93.

At the wire-holding parts 92, 93, 97, the wire 57 is press-fitting connected to the pressure welding terminal (terminal) 49b of the busbar 49 and to the pressure welding terminal (pressure welding part) 8b situated low of the connector block 3, 4 shown in FIG. 1. The pressure welding is generally carried out by pressing the wire 57 to the pressure welding terminal from above by using a jig blade. After all wires 57 are pressure welded to the random wiring module 52, the cross wiring module 56 is placed on the random wiring module 52.

Figure 4:
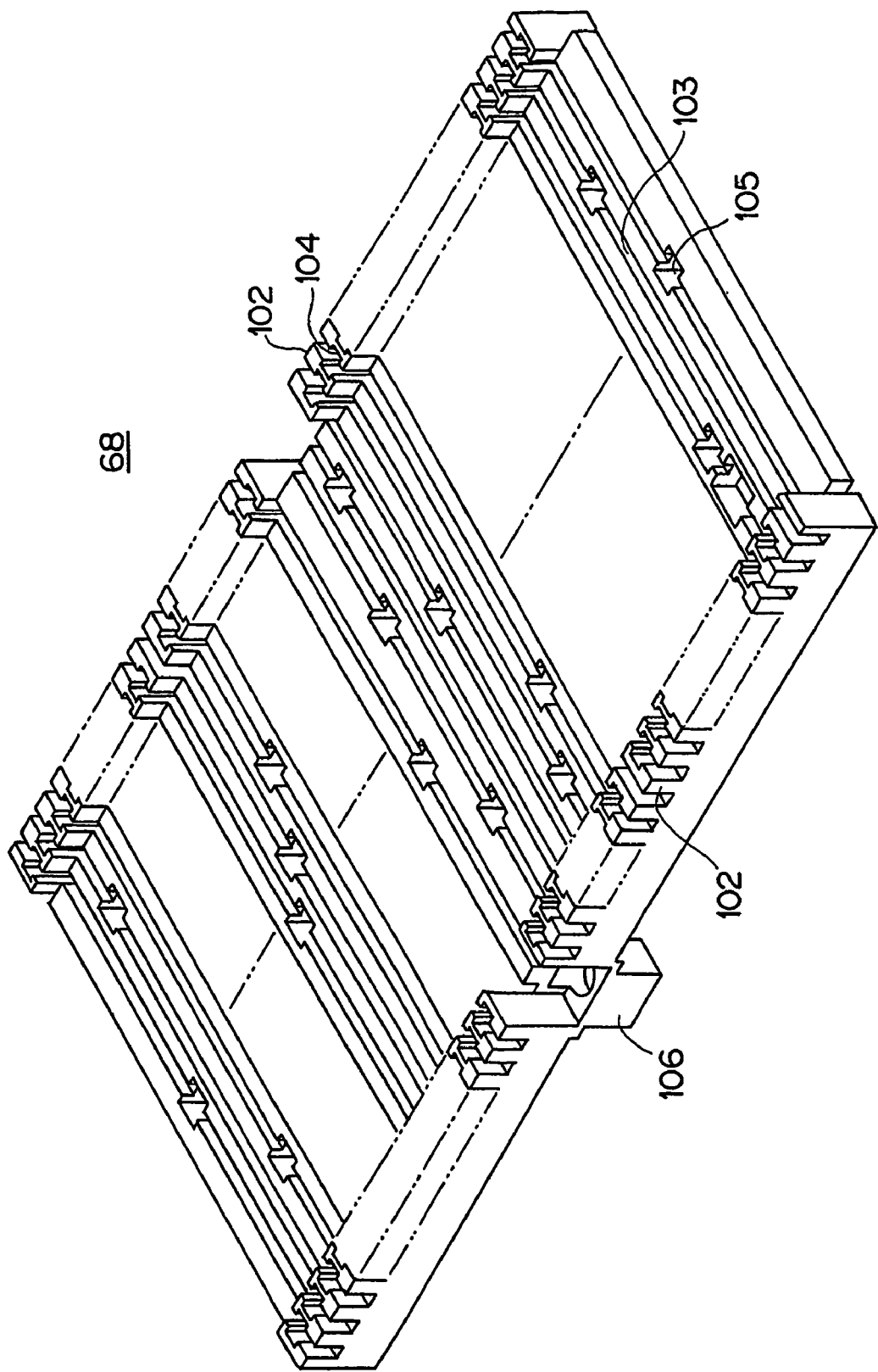
FIG. 4 is a perspective view illustrating a preferred embodiment of a lower-layer wiring board constituting a cross wiring module as a constitutional component of the junction block.
Figure 5:
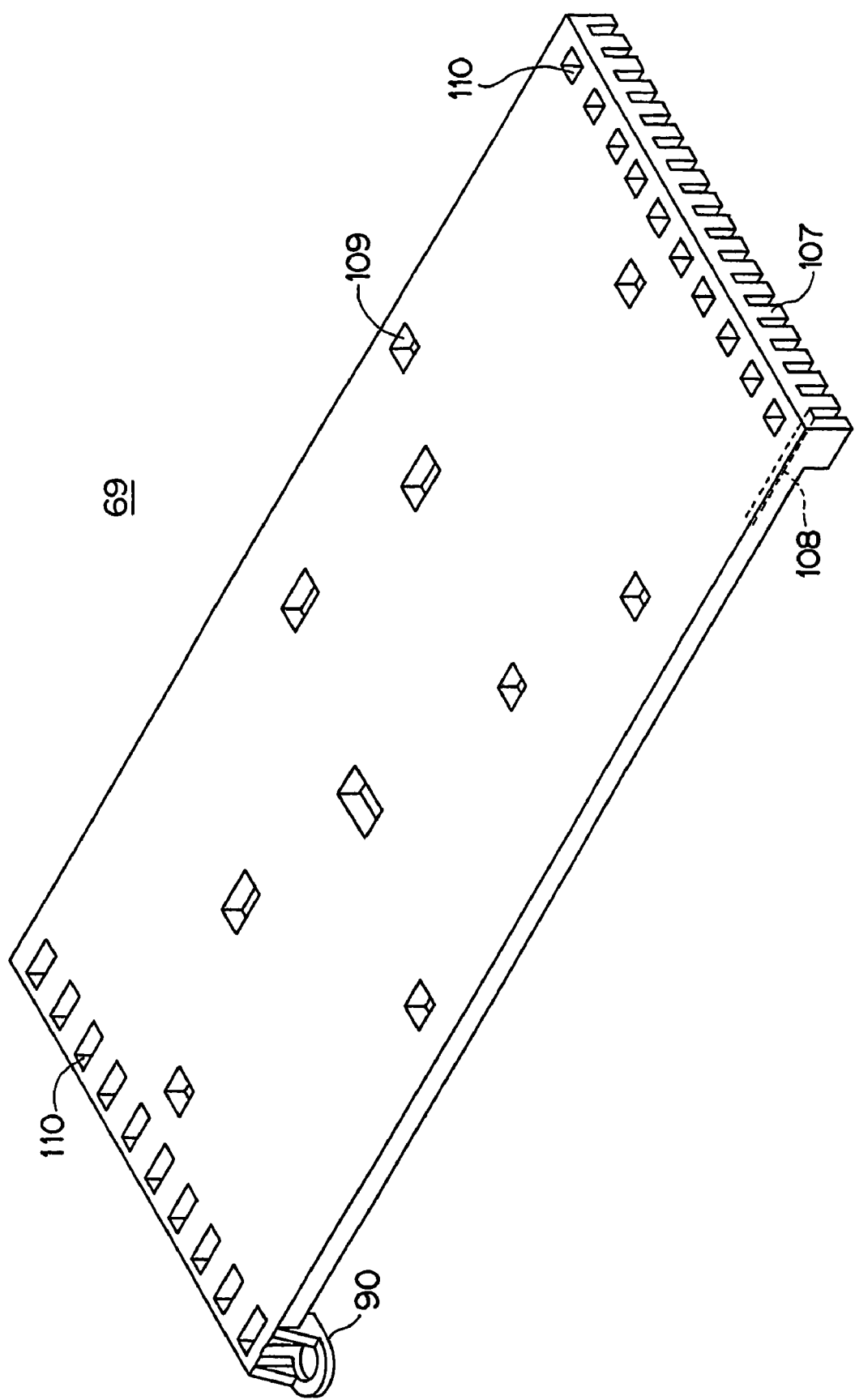
FIG. 5 is a perspective view illustrating a preferred embodiment of an upper-layer wiring board.

FIG. 4 shows a preferred embodiment of the lower board 68 made of insulating resin of the cross wiring module 56. FIG. 5 shows a preferred embodiment of the upper board 69 of the cross wiring module 56.

As shown in FIG. 4, the lower board 68 has: a plurality of wire-holding parts 102 situated in parallel with the same pitch facing left and right on both left and right edges of the board 68; and straight wire-receiving grooves 103 that connects the wire-holding parts 102 situated both edges, in parallel with the same pitch in the width direction of the board 68. The wire-holding part 102 consists of a pair of nipping projections and a pressure welding terminal insertion hole 104 crossing at right angles a groove formed between the pair of the nipping projections. Each rectangular hole 105 for cutting and connecting the wire is provided in the middle (i.e. required position) of the longitudinal direction of the wire-receiving groove 103.

Each wire 58 (FIG. 1) is straightly received and held into the wire-receiving groove 103 and both ends of the wire 58 are nipped and fixed by the wire-holding parts 102 situated on both sides. The wire 58 is cut at a required position or, alternatively, connected to the wire 59 (FIG. 1) on the upper board 69 shown in FIG. 5 by means of welding or the like. The reference numeral 106 in FIG. 4 denotes a fixing part such as a fixing part by a screw to the inner cover 2 (FIG. 1).

As shown in FIG. 5, the upper board 69 includes wire-holding parts 107, each extending downward and wire-receiving grooves 108, wherein the wire-holding parts 107 are arranged in parallel with the same pitch on the front and rear edges in the longitudinal direction of the board 69, while the wire-receiving grooves 108 are straightly arranged in parallel with the same pitch in the longitudinal direction of the board 69 connecting the wire-holding parts 107 situated at both edges. Pressure welding terminal insertion holes 110 are provided in the wire-holding parts 107. Each hole 109 for cutting and connecting the wire is provided at a required position in the longitudinal direction of the wire-receiving groove 108.

The wire 59 (FIG. 1) is cut at the hole 109 or, alternatively, the wire 59 is connected to the wire 58 of the lower board 68 (FIG. 4) by means of welding or the like, thereby obtaining a desired circuit form according to a specification of the circuit. The reference numeral 90 in FIG. 5 denotes a fixing part such as a fixing part by a screw to the inner cover 2.

Figure 6:
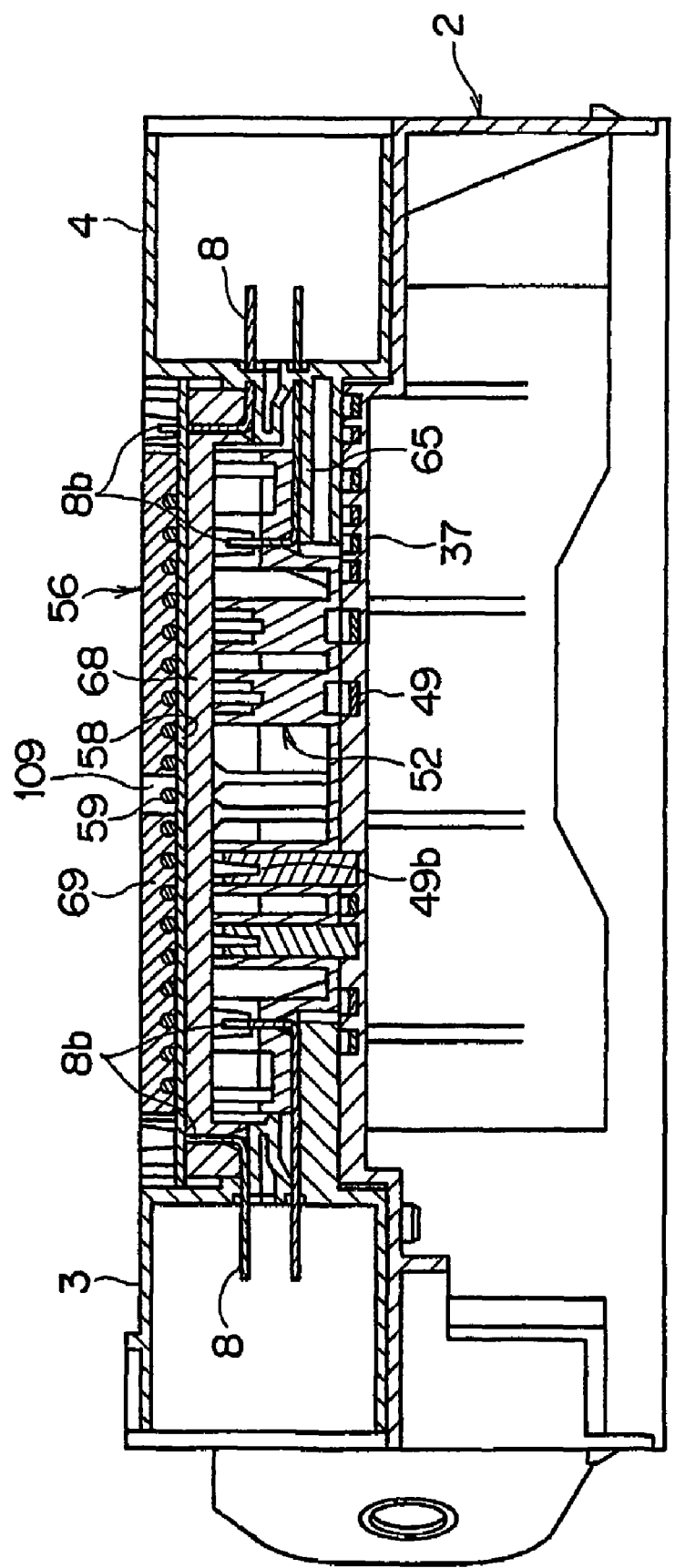
FIG. 6 is a longitudinal cross sectional view (cross sectional view sectioned with a cutting line extending in the left and right direction) illustrating a sub-assembling state of the junction block.

FIG. 6 shows a longitudinal cross sectional view (cross sectional view sectioned with a cutting line extending in the left and right direction) illustrating a sub-assembling state of the junction block 1.

The random wiring-module 52 is placed on the horizontal base plate 37 of the inner cover 2. The busbars 49 are horizontally arranged between the base plate 37 and the random wiring module 52. The cross wiring module 56 is piled up on the random wiring module 52. The upper pressure welding part 8b of each terminal 8 of the connector blocks 3, 4 is extended long inwardly (horizontally) on the seat 65 and pressure-welding connected to the corresponding wire 57 of the random wiring module 52. The lower pressure welding part 8b protrudes short horizontally and pressure-welding connected to the corresponding wire 58 situated on the lower layer side of the cross wiring module 56. The wire 58 of the board 68 of the cross wiring module 56 crosses the wire 59 of the board 69 of the cross wiring module 56 at right angles.

The electronic control circuit board 50 shown in FIG. 1 is placed under the base plate 37 of the inner cover 2. A thin cover (not shown in the figure) is applied on both ends situated up and down of the inner cover 2.

In the preferred embodiment described above, the cross wiring module 56 is placed on the random wiring module 52, however, instead, the random wiring module 52 may be placed on the cross wiring module 56. In the latter case, the wiring board 54 situated low of the cross wiring module 56 is formed narrow and connected to the lower pressure welding part 8b of the connector block 3, 4, while the random wiring module 52 is formed wide and connected to the upper pressure welding part 8b of the connector block 3, 4. The cross wiring module 56 needs to have a pressure welding terminal insertion hole in order to connect the middle part of the random wiring module 52 by the pressure welding terminal 49b of the busbar 49.

Further, instead of the pressure welding part 8b of the connector block 3, 4, the pressure welding terminal 89 of the power block 5 or the pressure welding terminal 49b, 49c of the busbars 49, a welding terminal may be used so that the welding terminal is welding connected to the corresponding electric wire 57-59 of the wiring module 52, 56. Alternatively, part of the terminals may be pressure welding terminals or welding terminals, that is, both of pressure welding terminals and welding terminals can be used.

Further, according to a specification of the circuit, the pressure welding parts 8b of either the connector block 3 or the connector block 4 may be formed not in two steps but in one step, likewise, the pressure welding terminals 89 of the power block 5 may be formed not in two steps but in one step, thereby obtaining the connection to only one of the random wiring module 52 and the cross wiring module 56.

Figure 7:
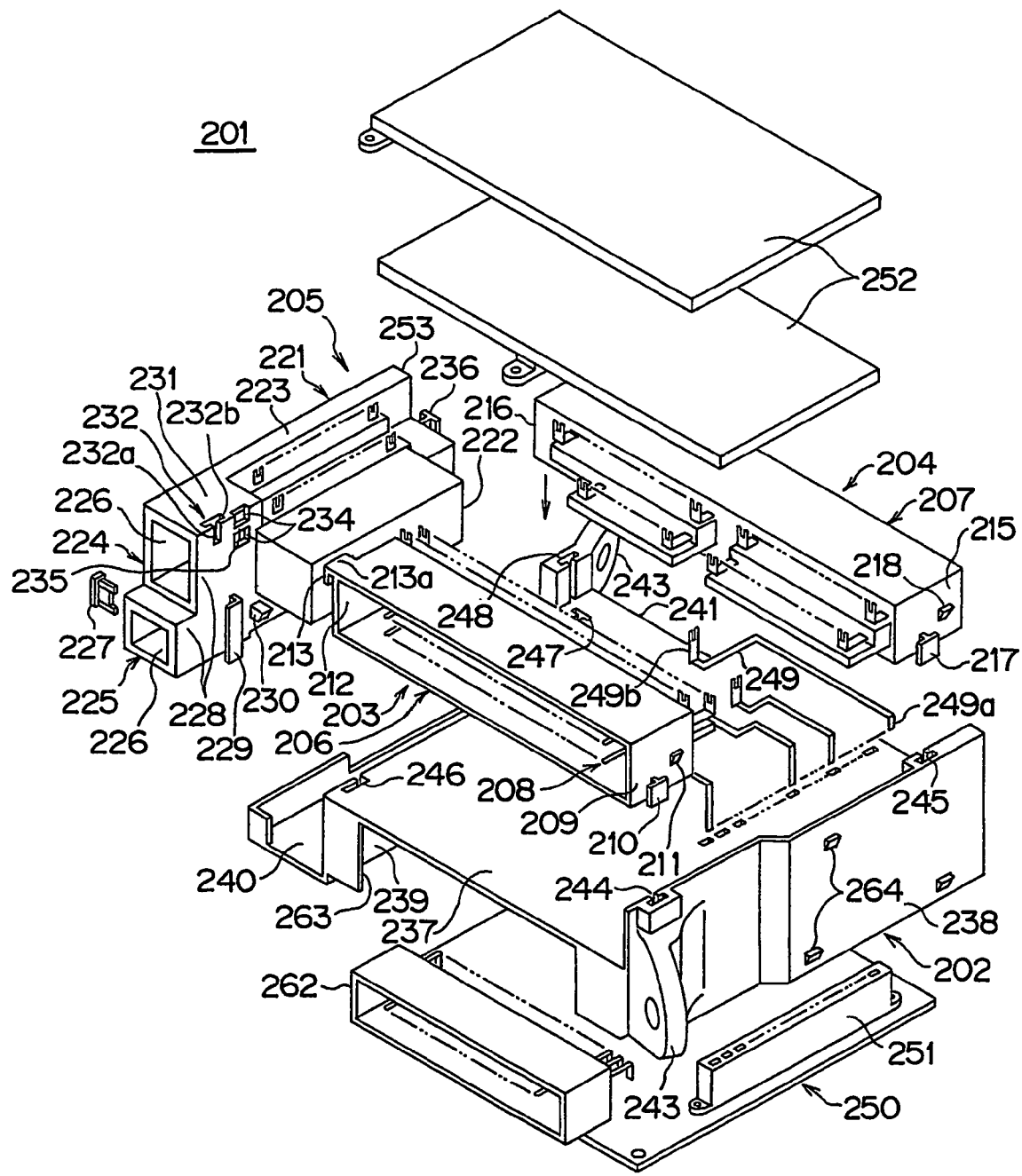
FIG. 7 is an exploded perspective view illustrating a preferred embodiment of a junction block according to the present invention.

FIG. 7 shows a preferred embodiment of a junction block according to the present invention.

The junction block 201 includes at least an inner cover (base cover) 202 made of synthetic resin, a pair of connector blocks 203, 204 situated in front and rear slidingly engaged with and fixed to the inner cover 202 from above, and a power block 205 situated at the side. One side of one connector block 203 is slidingly fixed to the inner cover 202, while the other side of the connector block 203 is slidingly fixed to the power block 205, thereby improving the strength of the assembled structure.

Each connector block 203, 204 includes corresponding connector housing 206, 207 made of synthetic resin and terminals 208 penetrating through the housing 206, 207. The first connector block 203 includes a slide-engaging part 210 having a T-shape in its lateral section and an engaging projection 211 having a triangle-shape in its vertical section on one side wall 209 of the housing 206, and a slide-engaging part 213 having a T-shape in its lateral section, the upper side and front side of the slide-engaging part 213 being covered with a hood-shaped wall 213a, and an engaging projection 214 (see FIG. 9) having a triangle-shape in its vertical section on the opposite side wall 212 of the housing 206. The slide-engaging part 210 slidingly engages with one side of the inner cover 202, while the slide-engaging part 213 slidingly engages with the back surface of the power block 205.

The second connector block 204 includes slide-engaging parts 217, 219 (see FIG. 11), each having a T-shape in its lateral section and engaging projections 218, 220 (see FIG. 11), each having a triangle-shape in its vertical section on side walls 215, 216 situated left and right of the housing 207. The slide-engaging part 217 slidingly engages with one side of the inner cover 202, while the slide-engaging part 219 slidingly engages with the other side of the inner cover 202.

In the power block 205, a relay (i.e. electric component) 222 is fixed to a fuse block 221 with an engaging means. The fuse block 221 includes: a base (i.e. fuse plate) 223 made of synthetic resin; connector housings 224, 225 integrally formed in two steps up and down on one side of the base 223; busbars (not shown in the figure) to be received in a plurality of steps in the base 223; pin-shaped or tab-shaped male terminals continuing to the busbars and protruding in the connector-fitting chamber 226 of the connector housings 224, 225 along with nipping terminals for connecting to the fuse; and a plurality of small (low) fuses 227. The connector housings 224, 225 and the terminals constitute a connector (224, 225).

A back wall 228 on the side of the lower connector housing 225 is provided with a slide-engaging part 229 having a L-shape in its lateral section and an engaging projection 230 both corresponding to the inner cover 202. The upper part of the back wall 228 and an upper wall 231 of the upper connector housing 224 are provided with an engaging hole (guide) 232 corresponding to the slide-engaging part 213 of the first connector block 203. The engaging hole 232 includes a hole 232a long in the longitudinal direction on the side of the back wall 228 and a hole 232b long in the lateral direction on the side of the upper wall 231. The hole 232 communicates with a dead space inside the connector housing 224 and the slide-engaging part 213 is received in the dead space.

Holes 234 or recesses 234 situated up and down are formed in the vicinity of the side of the engaging hole 232. There is formed an engaging wall 235 long in the lateral direction between the holes 234 or recesses 234. An engaging projection 214 (see FIG. 9) of the first connector block 203 engages with the engaging wall 235 after climbing over it from above.

The other side end of the base 223 of the power block 205 is provided with a slide-engaging part 236 having a T-shape in its lateral section. Each slide-engaging part 229, 236 of the one and other side of the power block 205 slidingly engages with the inner cover 202 from above.

The inner cover 202 includes: a horizontal plate 237; a vertical wall 238 crossing one side of the base plate 237 at right angles continuing in the up and down direction; a vertical wall 239 crossing the other side of the base plate 237 at right angles continuing downward; a horizontal bottom wall 240 extending from the bottom end of the wall 239 crossing at right angles; a wall 241 extending on the rear end side of the base plate 237 from the other side; and a vertical wall 242 continuing to the wall 241 crossing at right angles the wall 241, wherein the front end side of the vertical wall 242 and the vertical wall 238, each are provided with a vertical bracket (i.e. mount) 243 for fixing to a vehicle body or the like, which is integrally formed on a diagonal line, at the left end side thereof. Each bracket 243 has a hole for inserting a bolt therethrough. In the description described above, the directions such as front and rear, left and right, and up and down are only for making the explanation easy, that is, these directions may not agree with an actual setting direction of the junction block 201 to a vehicle or the like.

The front of the vertical wall 238 situated at one side is provided with a vertical guide groove (guide part) 244 having a T-shape in its lateral section corresponding to the slide-engaging part 210 of the first connector block 203 and an engaging recess (not shown in the figure) corresponding to the engaging projection 211 adjacently to each other. Further, the rear of the vertical wall 238 is provided with a vertical guide groove (guide part) 245 having a T-shape in its lateral section corresponding to the slide-engaging part 217 of the second connector block 204 and an engaging recess (not shown in the figure) corresponding to the engaging projection 218 adjacently to each other. The front guide groove 244 is formed on a thick portion in the vicinity of the upper part of the bracket 243.

A fuse block 221 is mounted along the other wall 239 of the inner cover 202 and a relay 222 is situated on the base plate 237 between both connector blocks 203 and 204. The front of the wall 239 is provided with a vertical guide groove (guide part) 246 having a L-shape in its lateral section corresponding to the one slide-engaging part 229 of the power block 205, while the rear wall 241 is provided with a vertical guide groove (guide part) 247 having a T-shape in its lateral section corresponding to the other slide-engaging part 236 of the power block 205. Further, the wall 242 in the vicinity of the bracket is provided with a vertical guide groove (guide part) 248 having a T-shape in its lateral section corresponding to a slide-engaging part 219 (see FIG. 11) of the second connector block 204. The two guide grooves 247, 248 are provided in the vicinity of the bracket 243.

Since the respective guide grooves 244, 247, 248 are provided in the vicinity of the corresponding brackets 243, the assembled structure of the junction block 201 is improved. That is, since the respective components are fixed to one another in the vicinity of the brackets 243, the respective components are fixed to a vehicle body or the like substantially integrally with the bracket 243, therefore the respective components are firmly fixed with a good precision of positioning without being influenced by a bending distortion of the inner cover 202.

In FIG. 7, a plurality of busbars 249 are arranged on a base plate 237 of the inner cover 202, thereby constructing a busbar circuit. Some terminals 249a of the busbar 249 are connected to a joint connector 251 of an electronic control circuit board 250 situated at the lower side after penetrating through holes of the base plate 237, while the other terminals 249b are pressure-welding connected to electric wires (not shown in the figure) of a circuit board 252 situated at the upper side. A plurality layers of the circuit boards 252 are piled up according to a form of the circuit. The electric wires of the circuit boards 252 are pressure-welding connected to pressure welding terminals 253 of the power block 205 and pressure welding parts of the terminals 208 situated in an upper and lower steps in the connector blocks 203, 204. The circuit boards 252 are fixed to the inner cover 202 with screws or the like. A thin under cover (not shown in the figure) made of synthetic resin is applied onto the electronic control circuit board 250, while an upper cover (not shown in the figure) is applied onto the circuit boards 252.

Figure 8:
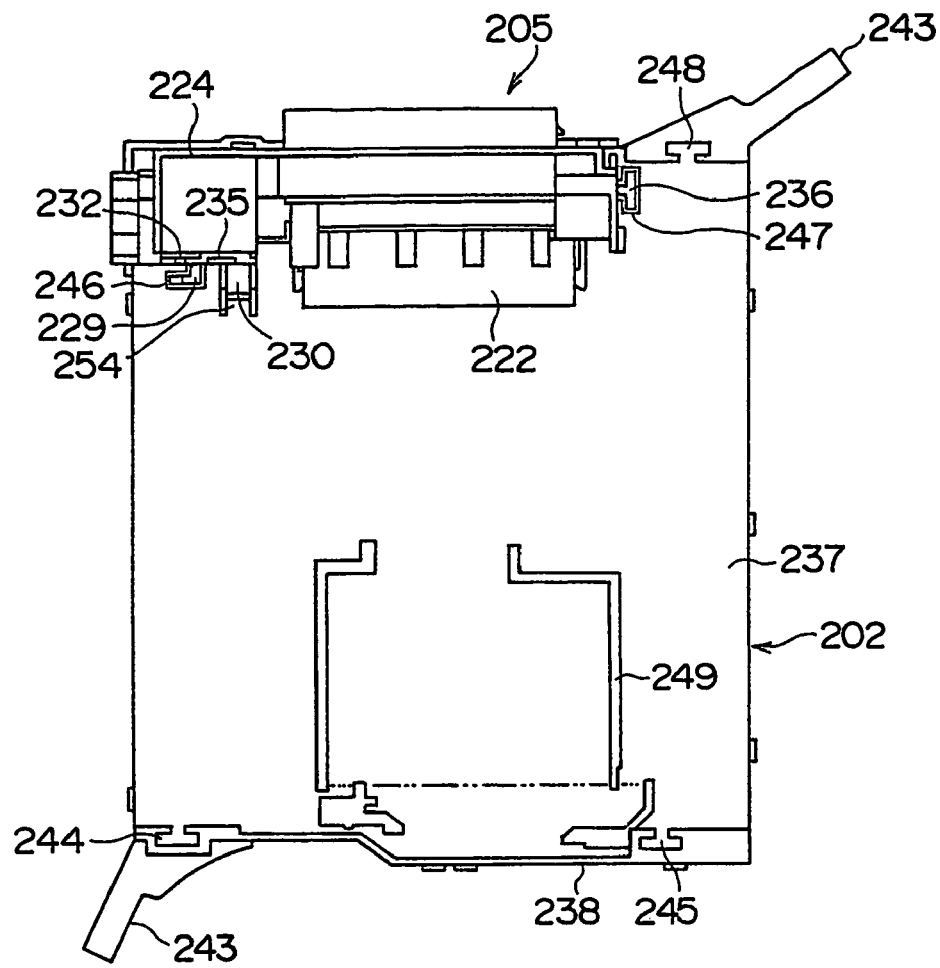
FIG. 8 is a plan view illustrating a combining structure of an inner cover and power block, which are constitutional components of the junction block.

FIG. 8 shows a plan view illustrating a state when the inner cover 202 and power block 205 are being combined.

The L-shaped slide-engaging part 229 of one end of the power block 205 slidingly engages with the guide groove 246 of the inner cover 202 from above and a projection 230 of the power block 205 is locked by a projection of a flexible engaging arm 254 extending downward of the inner cover 202, while a T-shaped slide-engaging part 236 of the other end of the power block 205 slidingly engages with the guide groove 247 of the inner cover 202 from above.

Both connector blocks 203 and 204 (FIG. 7) are slidingly engaged with both sides front and rear of the inner cover 202 from above. An outer wall of an upper connector 224 of the power block 205 is provided with an engaging hole (guide hole or guide part) 232 and engaging part 235 corresponding to the first connector block 203. The T-shaped guide groove 244, facing to the guide hole 232, corresponding to the first connector block 203 is provided in the vicinity of one bracket 243 of the inner cover 202. The T-shaped guide groove 248 corresponding to the second connector block 204 (FIG. 7) is provided in the vicinity of the other bracket 243. The T-shaped guide groove 245 is provided on the opposite side, practically facing to the guide groove 248.

A plurality of busbars 249 are arranged on the center of the base plate 237 of the inner cover 202. The connector blocks 203 and 204 are placed on both sides of the busbars 249.

Figure 9:
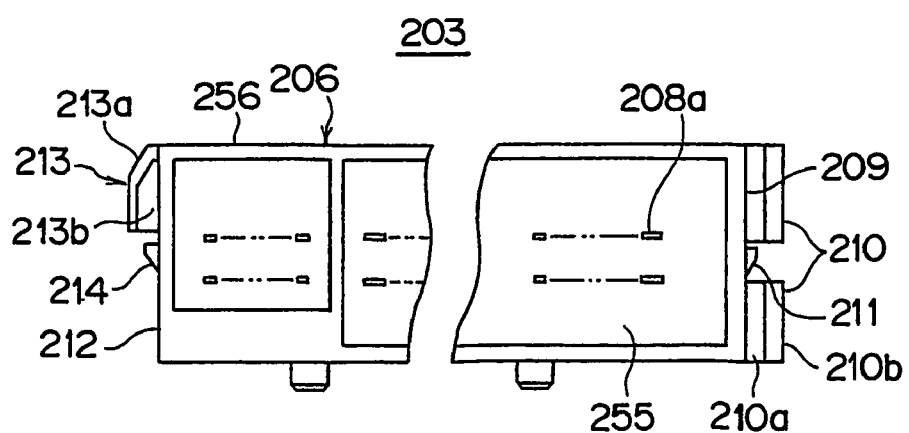
FIG. 9 is a front view illustrating the first connector block as the component.
Figure 10:
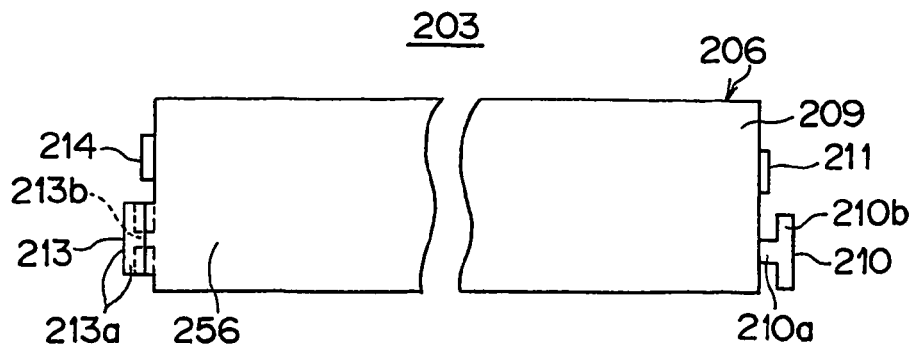
FIG. 10 is a plan view illustrating the first connector block.

FIGS. 9 and 10 show the first connector block 203.

The vertical wall 209 situated at one end of the housing 206 made of synthetic resin is provided with the T-shaped slide-engaging part 210 and the triangle-shaped engaging projection 211 formed in one piece. The slide-engaging part 210 includes a vertical rib 210a and a plate 210b crossing the rib 210a at right angles. The other T-shaped slide-engaging parts have the same constitution. As shown in FIG. 9, the slide-engaging part 210 is notched at the middle thereof in its height direction and the engaging projection 211 is located on the side of the notch. The slide-engaging part 210 engages with the inner cover 202.

The engaging projection 211 includes an inclined guide surface extending downward and horizontal engaging surface extending upward. An opening of connector-fitting chamber 255 is located in a direction crossing the extending direction of the slide-engaging part 210 at right angles and electric contacts 208a of a plurality of the terminals 208 are horizontally arranged in the connector-fitting chamber 255. A plurality of the connector-fitting chambers 255 are arranged in parallel.

The vertical wall 212 situated on the other end of the housing 206 is integrally provided with the slide-engaging part 213 having a T-shape in its lateral section including the vertical rib 213b and the wall 213a that covers the upper part and the front side of the rib 213b. The engaging projection 214 is provided on the lower side of the side of the slide-engaging part 213. The wall 213a includes an inclined part continuing to the upper wall 256 of the housing 206 and a vertical plate-shaped part continuing thereto. The vertical rib 213b is located inside the center of the wall 213a. The rib 213b reinforces the inverse L-shaped wall 213a so as not to be bent and increases the combination force. The slide-engaging part 213 engages with the power block 205.

Figure 11:
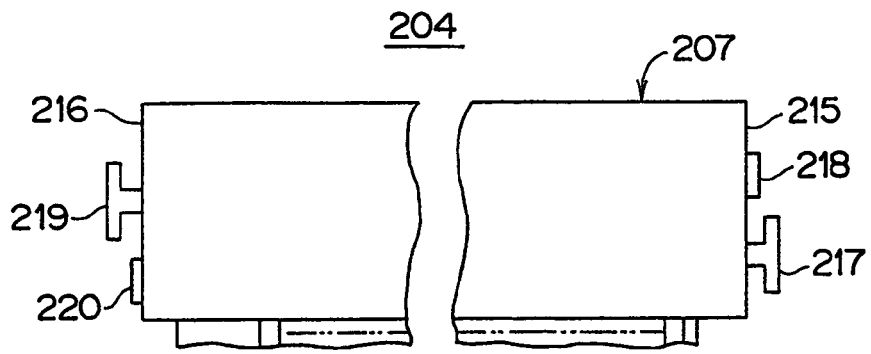
FIG. 11 is a plan view illustrating the second connector block as the component.

FIG. 11 shows the second connector block 204.

The vertical T-shaped slide-engaging part 217 is provided on the upper half of the vertical wall 215 situated at one end of the housing 207 made of synthetic resin. The engaging projections 218 is provided on the lower side of the side of the slide-engaging part 217. The slide-engaging part 219 extends vertically from the upper end to lower end of the vertical wall 216 situated at the other end of the housing 207. The middle part of the slide-engaging part 219 is notched and the engaging projection 220 is located at the side of the slide-engaging part 219. Both slide-engaging parts 217 and 219 slidingly engages with the left and right ends of the inner cover 202 from above.

Figure 12:
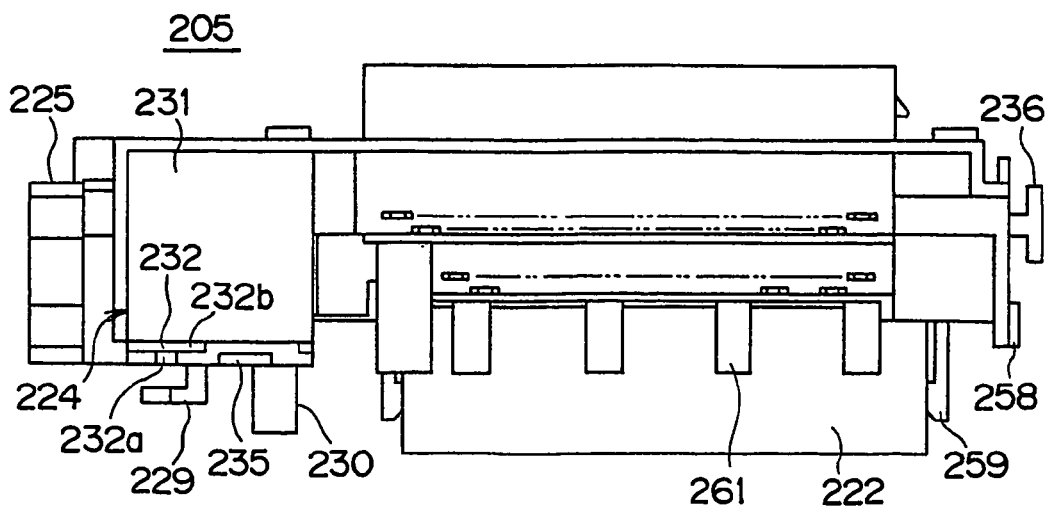
FIG. 12 is a plan view illustrating the power block.
Figure 13:
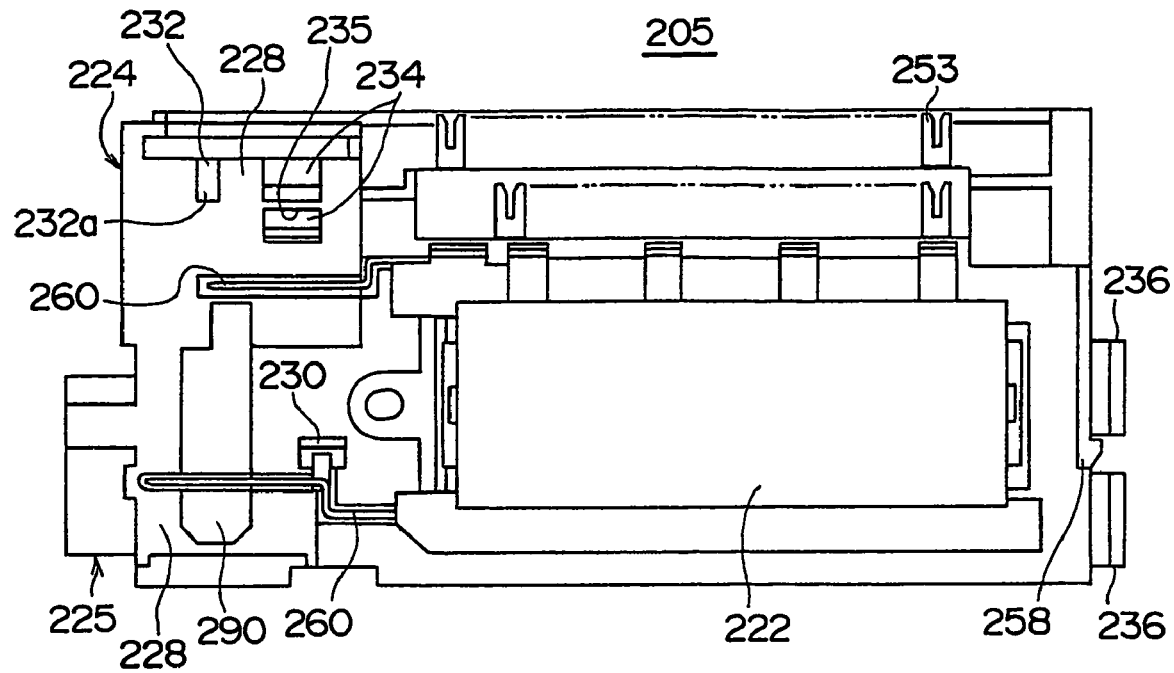
FIG. 13 is a back view illustrating the power block.
Figure 14:
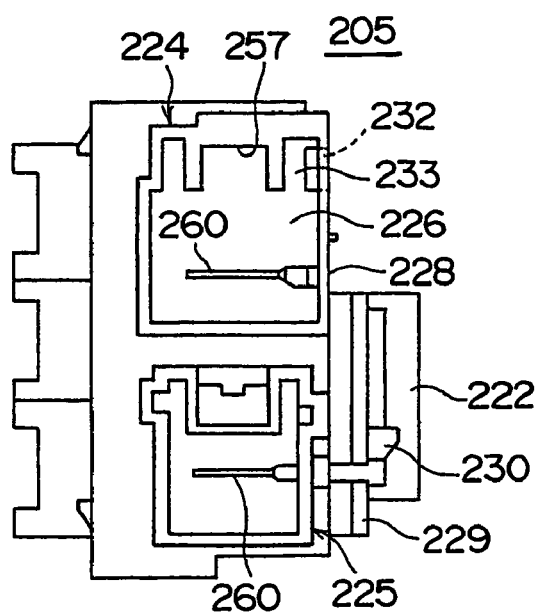
FIG. 14 is a side view illustrating the power block.

FIGS. 12-14 show the power block 205.

The L-shaped slide-engaging part 229 is vertically formed on the outer wall 228 of the connector 225 situated at lower side of one end of the power block 205. The engaging projection 230 is formed long in the horizontal direction on the lateral side of the slide-engaging part 229. The hole 232 having a T-shape in its plan view is provided at the crossing position of both walls 231 and 228 from the upper wall 231 to the back wall (side wall) 228 of the upper connector 224, at the upper position of the slide-engaging part 229. The upper and lower holes 234 and an engaging wall 235 situated therebetween are provided on the lateral side of the hole 232. The upper and lower holes 234 may be replaced by the recesses (The recess being effective for preventing dust from entering). The L-shaped slide-engaging part 229 engages with the inner cover 202 from above.

The hole 232 includes a vertically long hole part 232a and a horizontally long hole part 232b that crosses the hole part 232a at right angles communicating therewith. The hole 232 communicates with an inner space situated at the upper of the connector housing 224, that is, a dead space 233 on the side of a engaging part 257 situated at the center-upper part of the connector-fitting chamber 226. The engaging part 257 is a step or a recess for engaging a projection of a flexible engaging arm of a mating connector (not shown in the figure) of a wiring harness or the like.

The slide-engaging part 213 (FIG. 9) of the first connector block 203 engages with the hole 232 from above. The vertical rib 213b of the slide-engaging part 213 enters into and engages with the vertically long hole part 232a, while the wall 213a that covers the front of the rib 213b enters into and engages with the laterally long hole part 232b. Simultaneously, the engaging projection 214 climbs over the engaging wall 235 and enters into and engages with the lower hole 234. The wall 213a covers the hole part 232a and closes the hole part 232b, thereby preventing dust from entering from the outside. The inner surface of the wall 213a abuts against the inner surface of the wall 228 of the connector housing 224, thereby firmly connecting the connector 224 with the connector block 203.

Since the slide-engaging part 213 and engaging projection 214 enters into the dead space situated at the upper part of the connector housing 224, thereby not only obstructing the engagement of the mating connector but also making the combined structure of the connector block 203a and the power block 205 compact in a space-saving manner, that is, making the junction block 201 compact.

In FIGS. 12-14, the reference numeral 236 denotes a T-shaped slide-engaging part corresponding to the inner cover 202, the reference numeral 258 denotes an engaging projection corresponding to the inner cover 202, the reference numeral 259 denotes a flexible engaging arm for fixing the relay 222, the reference numeral 260 denotes a horizontal terminal of the busbar that enters into the connector 224, 225, the reference numeral 253 denotes a pressure welding terminal corresponding to an electric wire on the circuit board 252 (FIG. 7), and the reference numeral 261 denotes a welding terminal of the busbar.

In FIG. 7, as shown in FIG. 8, after the power block 205 is combined with (i.e. mounted on) the side of the inner cover 202, then the connector blocks 203 and 204 are combined with the inner cover 202 and the power block 205. When the slide-engaging parts 210, 213, 229 engage with the respective guide grooves 244, 246 formed in the walls of the respective constitutional components and the connector 224, the power block 205 adheres to the inner cover 202 without a gap and therefore, the connector blocks 203, 204 adhere to the inner cover 202 and the power block 205 without a gap.

If there are connectors (224, 225) on both sides of the power block 205, the second connector block 204 can be combined with the power block 205 similarly to the first connector block 203. Even if there is not the connector (224, 225), the base part 223 made of synthetic resin of the power block 205 can be provided with a guide hole, guide groove and engaging part for combining corresponding to the connector block 204.

In a state that the connector blocks 203, 204 are fixed (i.e. mounted) to the front and rear of the inner cover 202 with combining means, a plurality of the wiring boards 252 are fixed (i.e. mounted) on the center part (busbar mount part) of the inner cover 202 with screws. Each wiring board 252 is situated within a space formed between the connector blocks 203 and 204 in a space-saving manner. Further, the control circuit board 250 is fixed (i.e. mounted) on the back side of the inner cover 202 by screws and the connector 262 is exposed outside from a notched opening 263 of the inner cover 202. Upper and lower thin covers (not shown in the figure) are mounted on the outside of the wiring boards 252 and the control circuit board 250 together with the inner cover 202 and the connector blocks 203, 204. The upper and lower covers are engaged with an engaging projection 264 of the inner cover 202.

Thus, the power block 205, connector blocks 203, 204 and circuit board 250 are mounted on the inner cover 202 without a practical gap and in addition, the busbars 249 and a plurality layers of the wiring boards 252 are received between the pair of the connector blocks 203 and 204, thereby a dead space within the junction block 201 is reduced, enabling to make the junction block 201 thin and small.

The shape of each slide-engaging part in the junction block 201 may be a L-shape, T-shape or cross-shape not at right angles such as a Y-shape in the lateral section. The guide hole (engaging hole) 232 of the power block 205 corresponding to the slide-engaging part 213 of the connector block 203 may be formed in a wall (i.e. a part, the inside of which being a dead space) of the base 221 that receives the fuses and busbars therein, besides in the wall of the connector 224.

The slide-engaging part 213 of the power block 205 may enter into the dead space in the block from the guide hole 232 of the connector block 203. Further, slide-engaging part of the inner cover 202 may enter into the dead space in the block from the guide hole 232 formed on the lower side of the connector block 203, 204.

Further, as for the assembling method of the junction block 201 shown in FIG. 7, first the wiring boards 252 and the control board 250 may be assembled to the inner cover 202, thereafter the power block 205 and the connector blocks 203 and 204 may be assembled thereto in this sequence. The busbars 249 are arranged on the inner cover 202 in advance. In order to smoothly carry out the pressure welding of electric wires to the terminals 208 and 253, the best sequence of the assembling is to assemble the power block 205, the connector blocks 203 and 204, and the wiring boards 252 to the inner cover 202 in this sequence.

Furthermore, the inner cover 202 may be provided with the slide-engaging parts 210, 217, 219, 236 and engaging projections 211, 218, while the connector blocks 203, 204 and the power block 205 may be provided with the guide grooves 244, 245, 247, 248 and engaging recesses. Other constitutional components (not shown in the figure) such as a busbar circuit board, electronic unit or electronic board may be provided and connected thereto besides the wiring boards (i.e. circuit boards) 252.

In the following, a wiring structure of a wiring board, a junction block including the wiring board and a method of wiring a wiring board, by which an electric wire is prevented from being out of place and resetting of the wire is not necessary when a plurality of types of electric wires are arranged on an electrically insulating board, will be explained.

Figure 15:
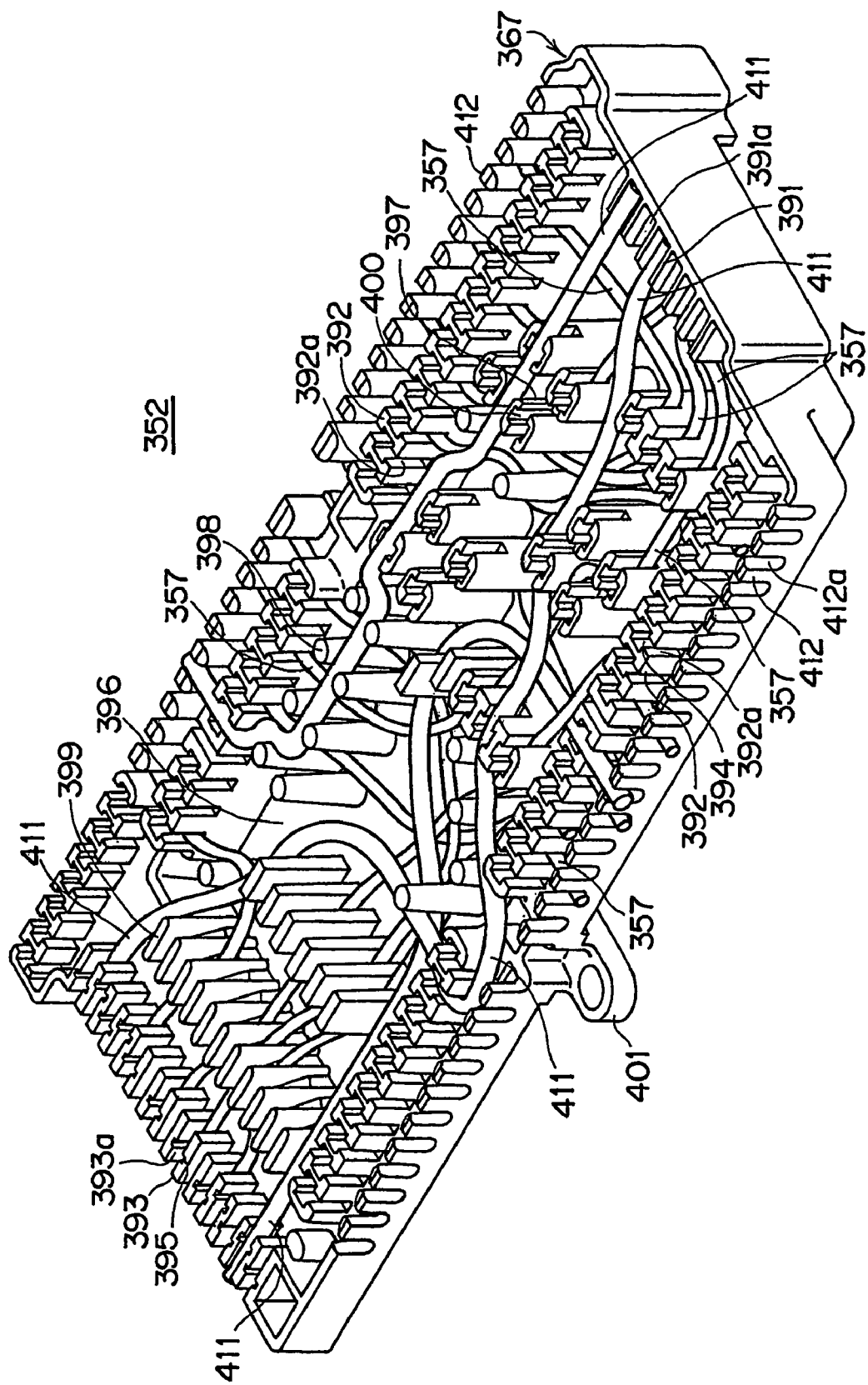
FIG. 15 is a perspective view illustrating a preferred embodiment of a wiring structure of a wiring board according to the present invention.
Figure 16:
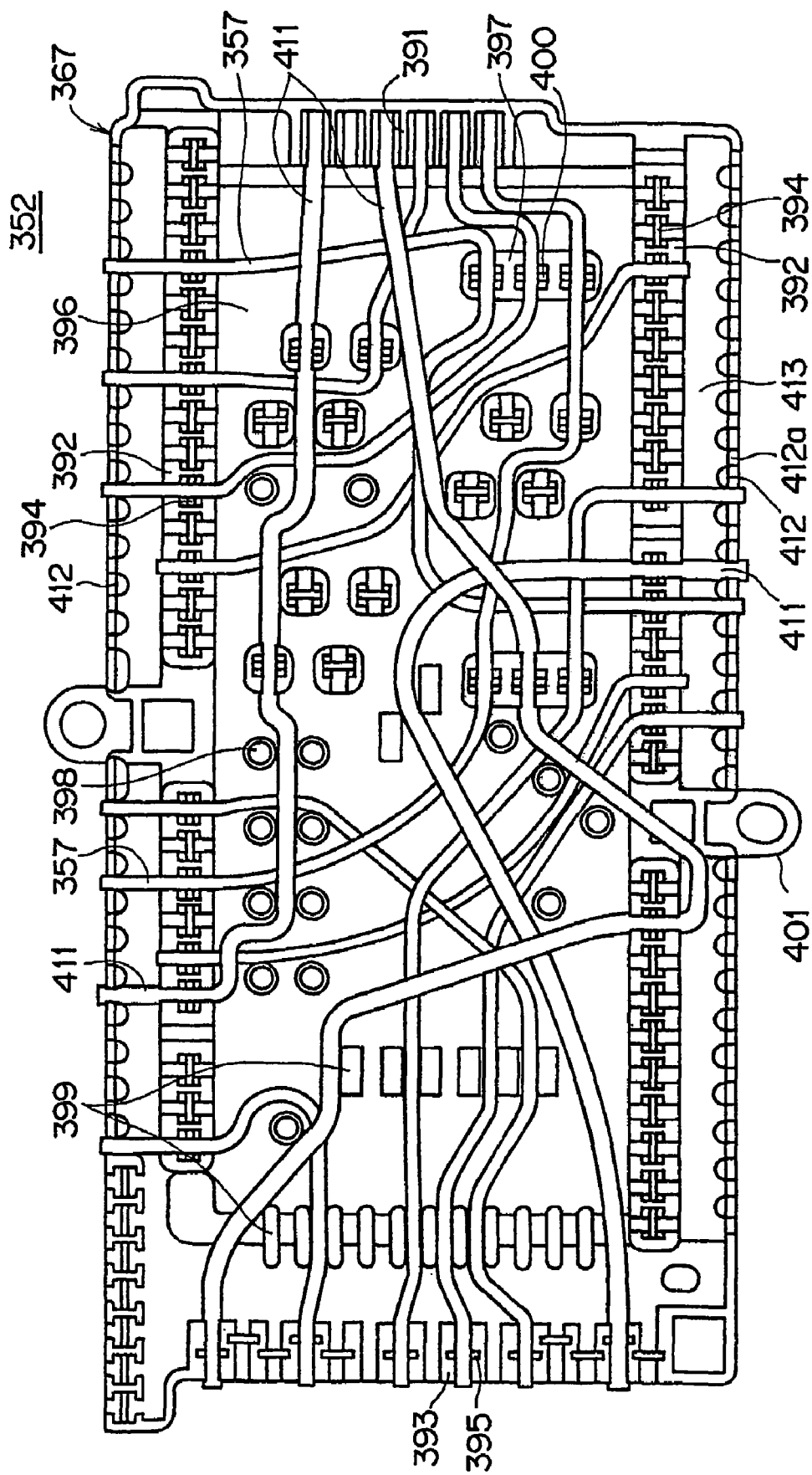
FIG. 16 is a plan view illustrating the wiring structure of the wiring board.

FIGS. 15 and 16 show a preferred embodiment of the wiring structure and wiring method of a wiring board according to the present invention.

A wiring board 352 includes an electrically insulating board 367 made of synthetic resin and a plurality of electric wires 357 and wires 411 having a small diameter and a large diameter, respectively, both are randomly arranged on the insulating board 367 in a required shape.

In the wiring board 367, there are provided a plurality of wire-holding parts 391-393 in parallel with the same pitch along four edges situated front and rear, and left and right, wherein pressure welding terminal insertion through holes 394, 395 are provided on the wire-holding parts 392 (front edge) and 393 (left edge). Each wire-holding part 391-393 consists of a pair of nipping projections and the electric wire 357, 411 is held by and fixed into a groove or slot 391a-393a formed between a pair of the nipping projections.

The outside of the wire-holding parts 392 situated at the left and right end is provided with further wire-holding parts 412 facing each other for holding an end of the wire 357, 411. A space (gap) 413 for guiding the wire 357, 411 therethrough in the front and rear direction between the wire-holding parts 392 and 412. The outer wire-holding part 412 consists of a pair of semi-circle shaped ribs and the end of the wire 357, 411 is nipped and fixed by a slot 412a situated between the pair of the ribs.

The inside part of the wiring board 367 surrounded by the electric wire-holding parts 391-393 from every direction is a low hollow part 396, in which wire-holding parts 397, each having a post-shape, wire-guiding parts 398, each having a pin-shape and wire-guiding parts 399, each having a rib-shape. The small-diameter wires 357 and large-diameter wires 411 can be received in the hollow part 396 in a state that the wires 357 and 411 are piled up (or cross one another). The depth of the hollow 396 is at least the summed length of the diameter of the wire 357 and that of the wire 411.

The wire-holding part 397 consists of a pair of nipping projections formed from a bottom wall of the hollow part 396 and a pressure welding terminal insertion hole 400 formed between the pair. The wire-guiding part 398 consists of a cylinder having a pin-shape formed from the bottom wall. The wire-guiding part 399 consists of a rib formed in parallel from the bottom wall. A bracket 401 is formed protruding outward on the left and right edges of the wiring board 367.

First the small-diameter wires 357 are arranged on the insulating board 367 in a required shape, thereafter the large-diameter wires 411 are arranged in a required shape. That is, the large-diameter wires 411 are placed over (or placed on) the small-diameter wires 357.

For example, an end of the small-diameter wire 357 is press-fitting fixed to the wire-holding parts 391-393 situated left and right or front and rear, the small-diameter wire 357 is hung and bent by the wire-guiding part 398 or, alternatively, the opposite end of the small-diameter wire 357 is press-fitting fixed to the wire-holding parts 391-393 after passing through the wire-guiding part 399. Alternatively, the small-diameter wire 357 passes through the wire-holding part 397 and then, is bent so that the opposite end of the wire 357 is press-fitting fixed to the wire-holding parts 391-393. After all the small-diameter wires 357 are arranged, then the large-diameter wires 411 are placed over (or placed on) the small-diameter wires 357. Preferably, the small-diameter wires 357 are received in the bottom of the hollow part 396 deeply.

After all the small-diameter wires 357 are arranged, for example, an end of the large-diameter wire 411 is press-fitting fixed to the wire-holding parts 391-393 situated left and right or front and rear, the large-diameter wire 411 is hung and bent by the wire-guiding part 398 or, alternatively, the opposite end of the large-diameter wire 411 is press-fitting fixed to the wire-holding parts 391-393 after passing through the wire-guiding part 399. Alternatively, the large-diameter wire 411 passes through the wire-holding part 397 and then, is bent so that the opposite end of the wire 411 is press-fitting fixed to the wire-holding parts 391-393. Thus, all the large-diameter wires 411 are arranged.

Since the small-diameter wires 357 are arranged first, when the large-diameter wires 411 are being arranged, the small-diameter wires 357 are pushed downward by the large-diameter wires 411 so that the small-diameter wires 357 are received within the insulating board 367 without being out of place. Since the restoring force (i.e. repulsion force) of the small-diameter wires 357 against bending is small, when the large-diameter wires 411 push the small-diameter wires 357 downward, for example, the small-diameter wires 357 keep their downward bent state, that is, the restoring force of the small-diameter wire 357 cannot take place, thereby the large-diameter wires 411 are prevented from being out of place.

So far, conventionally, when the large-diameter wires 411 are arranged first, since the restoring force (i.e. repulsion force) of the large-diameter wires 411 against bending is large, when the small-diameter wire 357 are arranged over the large-diameter wires 411, even if the large-diameter wires 411 are pushed downward by the small-diameter wire 357 so as to be bent downward, the small-diameter wire 357 are pushed back by the repulsion force of the large-diameter wires 411 so as to be out of place, thereby requiring the resetting of the small-diameter wire 57.

Therefore, if the small-diameter wire 357 are arranged first then the large-diameter wires 411 are arranged as the preferred embodiment of the present invention, such a problem as described above is completely solved.

Figure 17:
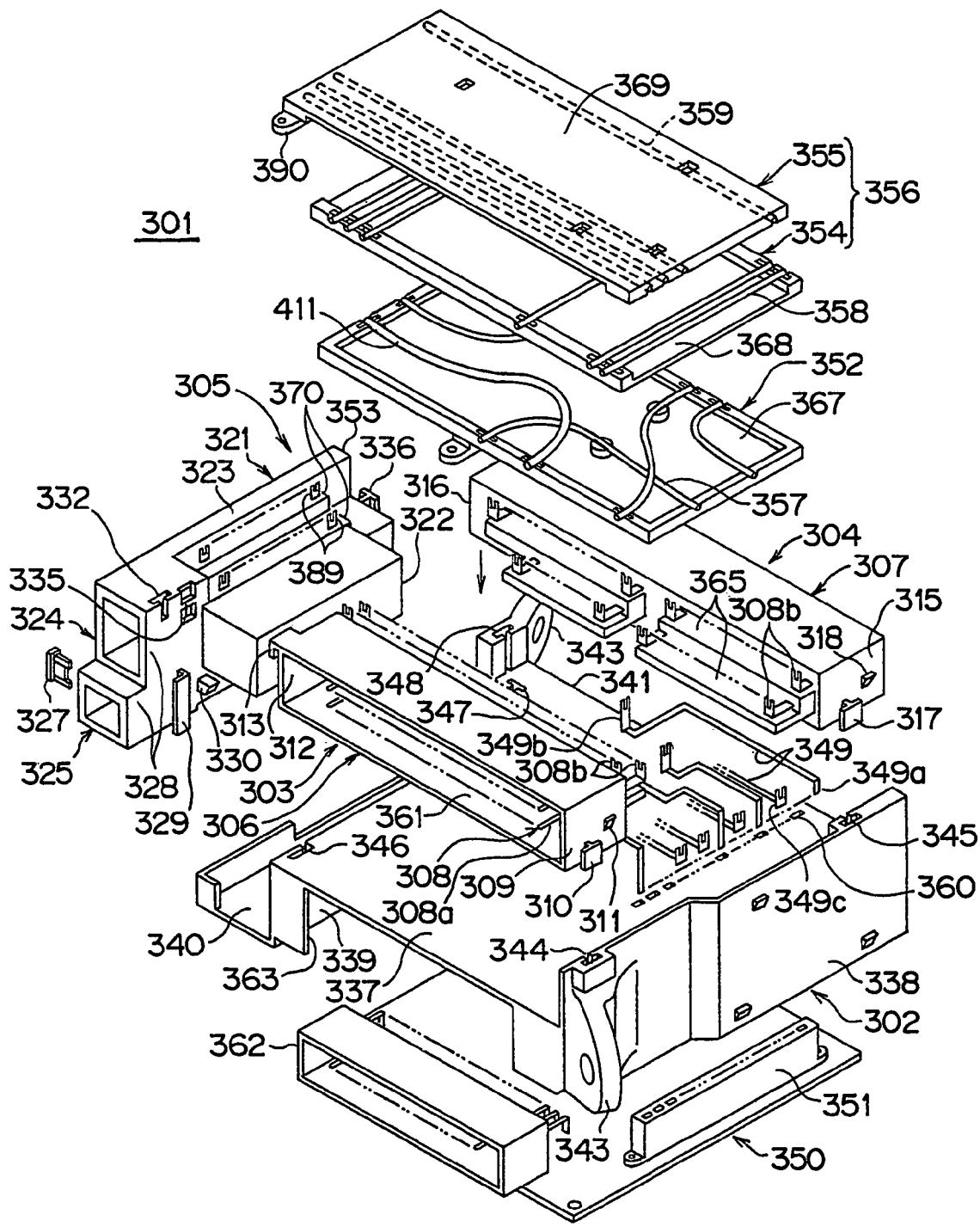
FIG. 17 is an exploded perspective view illustrating a preferred embodiment of a junction block including the wiring board.

The wiring pattern of the small-diameter wires 357 and large-diameter wires 411 shown in FIGS. 15 and 16 is only an example, that is, the pattern of the small-diameter wires 357 and large-diameter wires 411 may be modified suitably according to a circuit specification of the junction block 301 (FIG. 17). For example, as for the small-diameter wires 357 and large-diameter wires 411, the diameters of the core wires (i.e. conductor parts) thereof may be different from each other and the thickness of the insulating coatings may be the same. The large-diameter wires 411 may be used in a circuit in which large current flows, while the small-diameter wires 357 may be used in a circuit in which small current flows. In a junction block for use in a vehicle, the small-diameter wires 357 are main and the used amount of the large-diameter wires 411 is small compared to that of the small-diameter wires 357. For example, the used amount of the large-diameter wires 411 is a fraction of or tens of fractions of the used amount of the small-diameter wires 357. For example, the cross-sectional area of the conduction part of the small-diameter wires 357 is 0.5 sq ($mm^2$), while the cross-sectional area of the conduction part of the large-diameter wires 411 is 0.85 sq ($mm^2$).

At the wire-holding part 392, 393, 397 situated left and right sides and front side of the wiring board 352, the wire 357, 411 is pressure-welding connected to a pressure welding terminal (terminal) 349b of the busbar 349 or a pressure welding terminal (pressure welding part) 308b situated on the lower step of the connector block 303, 304 in the junction block 301 shown in FIG. 17. The pressure welding is generally carried out by pressing the wire 357, 411 to the pressure welding terminal from above by using a jig blade.

As an example, as for the small-diameter wires 357 of 0.5 sq and the large-diameter wires 411 of 0.85 sq, the respective values of the outer width and height of the pressure welding terminal is the same, respectively, and only the respective values of the inner width of the slot are not the same (that is, the slot for the small-diameter wire 357 being wider than the slot for the large-diameter wires 411). The press-fitting depth into the slot for the large-diameter wires 411 is larger than the press-fitting depth into the slot for the small-diameter wires 357, but the heights of the center of the wires 357 and 411 are the same.

In the preferred embodiment described above, the two types of wires 357 and 411 having different diameter are used. But if three or more types of wires having different diameter are used, these wires are arranged in sequence starting from the wire having small diameter to the wire having large diameter. In this case, the insulating coatings of the respective wires is the same material or has the same characteristic, and the stiffness and the bending stress are small for the wire having small diameter.

In the preferred embodiment described above, the two types of wires 357 and 411 having different diameter are used. But if two or more types of wires having the same diameter but the different stiffness or bending stress are arranged, the wires having low stiffness or bending stress are arranged first and thereafter, the wires having high stiffness or bending stress are arranged. That is, the wires are arranged in sequence starting from the wires having low stiffness or bending stress to the wires having high stiffness or bending stress.

The stiffness or the bending stress of the wire may vary depending on the material of the insulating coating of the wire. For example, as for the rubber codes in JIS-C3301; tensile strength and elongation of EP (ethylene-propylene) rubber code are not less than 0.41 $kg/mm^2$ and not less than 300%, respectively; tensile strength and elongation of SBR (styrene butadiene) rubber code are not less than 0.51 kg/mm$^2$ and not less than 300%, respectively; and tensile strength and elongation of fire-resistant chloroprene rubber code are not less than 0.61 kg/mm$^2$ and not less than 250%, respectively, and as for the vinyl codes in JIS-C3306, tensile strength and elongation of chloroethylene resin-based vinyl code are not less than 1.02 kg/mm$^2$ and not less than 100%, respectively. Therefore, the necessary arranging sequence (i.e. wiring sequence) for these types of the wires is a sequence starting from the wires having the insulating coating made of EP, then the wires having the insulating coating made of SBR, then the wires having the insulating coating made of chloroprene and finally the wires having the insulating coating made of chloroethylene resin. That is, the arranging (i.e. wiring) should be carried out in sequence starting from the wires having low elongation, low stiffness or low bending stress to the wires having high elongation, high stiffness or high bending stress.

The stiffness or the bending stress of the wire may vary depending on the hardness of the insulating coating of the wire. If the hardness is high, the stiffness or the bending stress is high. If the hardness is low, the stiffness or the bending stress is low. Therefore, the wires should be arranged in sequence starting from the wire having insulating coating having low hardness to the wire having insulating coating having high hardness.

Thus, since the stiffness or the bending stress of the wire may vary depending on additives or hardness of the insulating coating even if the materials of the coating are the same, the wires should be arranged in the sequence starting from those having low stiffness or bending stress to those having high stiffness or bending stress, taking characteristics of the stiffness and bending stress for the products of the wires into consideration.

Further, since the stiffness or the bending stress of the wire may vary depending on the types of the conductor part of the wire or the diameter of the conductor part, even if the characteristics of the insulating coating are the same, the wires should be arranged in the sequence starting from those having low stiffness or bending stress to those having high stiffness or bending stress, taking characteristics of the stiffness and bending stress for the products of the wires into consideration.

A junction block 301, which is shown in FIG. 17 as an example of a junction block including the wiring board 352 described above, includes: an inner cover 302 made of synthetic resin; a pair of connector blocks 303, 304 situated right and left to be slidingly engaged with and fixed to the inner cover 302 from above; a power block 305 situated on one side to be slidingly engaged with and fixed to the inner cover 302 from above; a plurality of busbars 349 mounted on the inner cover 302 between both connector blocks 303, 304; a random wiring board 532 to be piled on the inner cover 302 from above between both connector blocks 303, 304 and to be connected to the connector blocks 303, 304, power block 305 and busbars 349; and a cross wiring board 356 to be piled on the random wiring board 352.

Each connector block 303, 304 includes a housing 306, 307 made of synthetic resin and terminals 308 horizontally penetrating through the housing 306, 307. Each housing 306, 307 includes horizontal seats 365 formed in two steps (stepwise) up and down on the back side thereof, wherein one part of each terminal 8 projectingly situated within the connector-fitting chamber 361 as a male electric contact 308*a* having a pin-shape or tab-shape while an opposite part of the terminal 308 is formed standing up vertically from each seat 365 as a pressure welding part (terminal) 308*b*. The pressure welding part 308*b* on a seat of the housing 306 faces to the pressure welding part 308*b* on a seat of the housing 307.

The pressure welding part 308*b* includes a pair of pressure welding pieces and a slot between the pressure welding pieces, wherein a blade part located on the inlet side of the slot cuts an insulating coating of an electric wire and an inner end surface of each pressure welding piece strongly comes in contact with a conductor part (i.e. core wire) of an electric wire. This situation is the same as that of a pressure welding terminal. (The pressure welding part means the pressure welding terminal.)

Each lower pressure welding part 308*b* of the connector blocks 303, 304 is pressure-welding connected to an end situated left or right of an electric wire 357, 411 after penetrating through an end situated left or right of the wiring board 367 of the random wiring board 352 situated on the lower side, while each upper pressure welding part 308*b* of the connector blocks 303, 304 is pressure-welding connected to an end situated left or right of an electric wire 358 after penetrating through an end situated left or right of the second layer wiring board 354 of the cross wiring board 356 situated on the upper side.

A plurality of busbars 349 are arranged in a required shape on a base plate 337 of the inner cover 302, thereby a busbar circuit board is constituted. Each busbar 349 is arranged in a manner that one end of each busbar 349 is arranged in a lateral line in the vicinity of a wall 338 of the rear end of the inner cover 302, wherein each busbar 349 extends in a require shape up to the middle of the base plate 337, along the base plate 337 starting from the one end of the busbar 349, wherein the position of the opposite end of each busbar 349 is set randomly.

The male terminal 349*a* extending downward at an end of the busbar 349 is connected to a connector 351 of an electronic control circuit board (i.e. electronic unit) 350 situated on a lower side after penetrating through a hole 360, which is arranged in a line with the other holes on the base plate 337.

The pressure welding terminal (terminal) 349*c* extending upward at an end of the busbar 349 is pressure-welding connected to an electric wire 359 at a rear end of the upper layer wiring board 355 of the cross wiring board 356. The pressure welding terminal 349*b* extending upward at the opposite end of the busbar 349 is pressure-welding connected to an electric wire 357, 411 at the middle in the longitudinal direction of the insulating board 367 after penetrating through the board 367 of the random wiring board 352.

The boards 367-369 of the wiring boards 352, 356 can be piled up with a plurality of those according to a specification of the circuit. Each wiring boards 352, 356 is fixed to the inner cover 302 at a corresponding bracket 390, 401 thereof with a screw or the like.

A relay 322 is mounted on the back side of a base 323 of the power block 305. Seats 370 are formed on the base 323 in two steps up and down on the upper side of the relay 322. Pressure welding terminals (terminals) 389 are arranged in a line on the seats 370. Each pressure welding terminal is connected to a corresponding busbar (not shown in the figure) in the power block.

The lower pressure welding terminal 389 is pressure-welding connected to an electric wire 357, 411 at a front end of the board 367 after penetrating through the board 367 of the random wiring board 352, while the upper pressure welding terminal 389 is pressure-welding connected to an electric wire 359 at a front end of the wiring board 355 of the upper cross wiring board 356.

A wide and thin upper cover (not shown in the figure) made of synthetic resin is applied on the inner cover 302 from above the cross wiring board 356, wherein the upper cover covers and protects the connector blocks 303, 304, wiring boards 352, 356, and power block 305.

In the description described above, the directions such as front and rear, left and right, and up and down are the definition with supposing that the power block is situated in the front, that is, the definition of the directions is only for aiding an explanation and the definition may not agree with an actual setting direction of the junction block.

The first connector block 303 includes: a slide-engaging part 310 and an engaging projection 311 on one side wall 309 of the housing 306; and a slide-engaging part 313 and an engaging projection (not shown in the figure) on the opposite side wall 312 of the housing 306. The slide-engaging part 310 is slidingly engaged with one side of the inner cover 302, while the other slide-engaging part 313 is slidingly engaged with the back side of the power block 305.

The second connector block 304 includes a slide-engaging part 317 and an engaging projection 318 on the side walls 315 and 316 situated right and left of the housing 307, respectively. The slide-engaging part 317 is slidingly engaged with one side of the inner cover 302, while the other slide-engaging part (not shown in the figure) is slidingly engaged with the other side of the inner cover 302.

In the power block 305, a relay 322 is fixed to a fuse block 321 with an engaging means. The fuse block 321 includes: a base 323 made of synthetic resin; connector housings 324, 325 integrally formed in two steps up and down on one side of the base 323; busbars (not shown in the figure) to be received in a plurality of steps in the base 323; male terminals protruding in the connectors 324, 325 along with nipping terminals continuing to the busbars for connecting to the fuse; and a plurality of small (low) fuses 327. For example, an external power source is supplied to the one connector while the other connector is connected to loads.

A back wall 328 on the side of the lower connector housing 325 is provided with a slide-engaging part 329 and an engaging projection 330 both corresponding to the inner cover 302. The back wall 328 of the upper connector housing 324 is provided with an engaging hole 332 corresponding to the slide-engaging part 313 of the first connector block 303.

There is formed an engaging wall 335 on the side of the engaging hole 332. An engaging projection (not shown in the figure) of the first connector block 303 engages with the engaging wall 335.

The other side end of the base 323 of the power block 305 is provided with a slide-engaging part 336. Each slide-engaging part 329, 336 of the one and other side of the power block 305 slidingly engages with the inner cover 302 from above.

The inner cover 302 includes: a horizontal plate 337; a vertical wall 338 crossing the rear end of the base plate 337 at right angles continuing in the up and down direction; a vertical wall 339 crossing the front end of the base plate 337 at right angles continuing downward; a horizontal bottom wall 340 extending from the bottom end of the wall 339 crossing at right angles; a wall 341 extending on the right end of the base plate 337; and a vertical wall continuing to the wall 341 crossing at right angles the wall 341, wherein the vertical wall and the left end side of the vertical wall 338 situated at the rear end, each is provided with a vertical bracket 343 for fixing to a vehicle body or the like, which vertical bracket 343 are integrally formed on a diagonal line.

The left side of the vertical wall 338 at the rear end is provided with a vertical guide groove 344 corresponding to the slide-engaging part 310 of the first connector block 303 and an engaging recess (not shown in the figure) corresponding to the engaging projection 311 adjacently to each other.

Further, the right side of the vertical wall 338 is provided with a vertical guide groove 345 corresponding to the slide-engaging part 317 of the second connector block 304 and an engaging recess (not shown in the figure) corresponding to the engaging projection 318.

A fuse block 321 is mounted along the front wall 339 of the inner cover 302 and a relay 322 is situated on the base plate 337 between both connector blocks 303 and 304. The left side of the wall 339 is provided with a vertical guide groove 346 corresponding to the one slide-engaging part 329 of the power block 305, while the right wall 341 is provided with a vertical guide groove 347 corresponding to the other slide-engaging part 336 of the power block 305. Further, the wall in the vicinity of the bracket is provided with a vertical guide groove 348 corresponding to a slide-engaging part (not shown in the figure) of the second connector block 304.

An electronic control circuit board (i.e. electronic unit) 350 is received under the base plate 337 of the inner cover 302. The electronic control circuit board 350 includes circuit boards each having a printed circuit and so on, connectors 351, 362 provided on the circuit board, and electronic components (not shown in the figure). The electronic control circuit board 350 is fixed to the inner cover 302 with a screw or the like. A thin under cover (not shown in the figure) made of synthetic resin is provided with respect to the inner cover 302 from the lower side of the electronic control circuit board 350. The under cover protests the electronic control circuit board 350 from the outside.

In FIG. 17, in a state that the connector blocks 303, 304 are fixed (i.e. mounted) to the front and rear of the inner cover 302 with combining means, the wiring boards 352, 356 are fixed (i.e. mounted) on the center part (busbar mount part) of the inner cover 302 with screws. Each wiring board 352, 356 is situated within a space formed between the connector blocks 303 and 304 in a space-saving manner.

Thus, the power block 305, connector blocks 303, 304 and circuit board 350 are mounted on the inner cover 302 without a practical gap and in addition, the busbars 349 and a plurality layers of the wiring boards 352, 356 are received between the pair of the connector blocks 303 and 304, thereby a dead space within the junction block 301 is reduced, enabling to make the junction block 301 thin and small.

Figure 18:
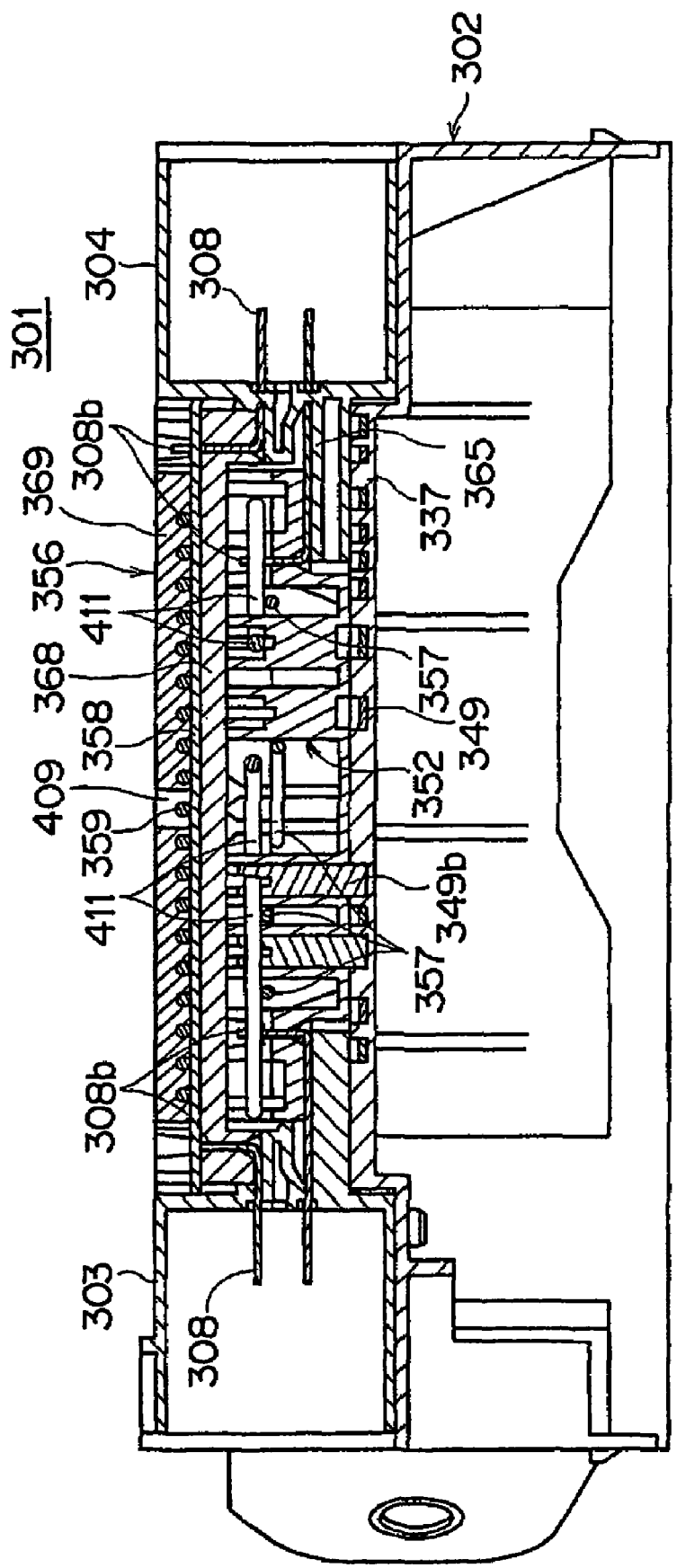
FIG. 18 is a longitudinal cross sectional view illustrating an assembled state of the junction block.

FIG. 18 shows a longitudinal cross sectional view (cross sectional view sectioned with a cutting line extending in the left and right direction) illustrating a sub-assembling state of the junction block 301.

The random wiring board 352 is placed on the horizontal base plate 337 of the inner cover 302. The busbars 349 are horizontally arranged between the base plate 337 and the random wiring board 352. The cross wiring board 356 is piled up on the random wiring board 352. The lower pressure welding part 308b of each terminal 308 of the connector blocks 303, 304 is pressure-welding connected to the corresponding wire 357, 411 of the random wiring board 352. The upper pressure welding part 308b is pressure-welding connected to the corresponding wire 358 situated on the lower layer side of the cross wiring board 356. In the random wiring board 352, the large-diameter wire 411 is located on the upper side, while the small-diameter wire 357 is located on the lower side. The inside of the wiring board 352 is provided with a space large enough to receive the wires 357 and 411, which cross each other up and down or is piled one on another. The wire 358 of the board 368 of the cross wiring board 356 crosses the wire 359 of the board 369 of the cross wiring board 356 at right angles.

In this connection, instead of the pressure welding part 308b of the connector block 303, 304, the pressure welding terminal 389 of the power block 305 or the pressure welding terminal 349b, 349c of the busbars 349, a welding terminal may be used so that the welding terminal is welding connected to the corresponding electric wire 357-359, 411 of the wiring board 352, 356. Alternatively, part of the terminals may be pressure welding terminals or welding terminals, that is, both of pressure welding terminals and welding terminals can be used.

That is, the wiring structure of the wiring board is characterized in that electric wires having low bending stiffness are arranged on an electrically insulating board, while electric wires having high bending stiffness are arranged over the electric wires having low bending stiffness.

With the construction described above, when first the wires having low bending stiffness are arranged then the wires having high bending stiffness are arranged thereover, the wires having high bending stiffness push the wires having low bending stiffness downward so as to prevent repulsion force of the wires having low bending stiffness from occurring or, alternatively, the wires having low bending stiffness are arranged without generating repulsion force and the wires having high bending stiffness are placed thereon, therefore all the wires are arranged without being out of place.

To the contrary, in a case that the wires having low bending stiffness are arranged over the wires having high bending stiffness, the wires having low bending stiffness are pushed by the repulsion force of the wires having high bending stiffness so as to be out of place. With the construction of the present invention, such a problem is securely prevented from occurring.

The electric wire having low bending stiffness may be a small-diameter electric wire, while the electric wire having high bending stiffness may be a large-diameter electric wire.

The electric wire having low bending stiffness may be an electric wire including an insulating coating having low hardness, while the electric wire having high bending stiffness may be an electric wire including an insulating coating having high hardness.

Further, the junction block may have the wiring structure of the wiring board as described above. With the construction described above, when the junction block is assembled, the wires arranged on the wiring board are prevented from being out of place, thereby enabling an efficient assembly of the junction block (i.e. electric junction box).

The method of wiring a wiring board, in which a plurality of types of electric wires having different bending stiffness are arranged on an electrically insulating board, is characterized in that the wiring is carried out in sequence starting from the type of the electric wire having low bending stiffness to the type of the electric wire having high bending stiffness.

With the construction described above, when first the wires having low bending stiffness are arranged then the wires having high bending stiffness are arranged thereover, the wires having high bending stiffness push the wires having low bending stiffness downward so as to prevent repulsion force of the wires having low bending stiffness from occurring or, alternatively, the wires having low bending stiffness are arranged without generating repulsion force and the wires having high bending stiffness are placed thereon, therefore all the wires are arranged without being out of place.

To the contrary, in a case that the wires having low bending stiffness are arranged over the wires having high bending stiffness, the wires having low bending stiffness are pushed by the repulsion force of the wires having high bending stiffness so as to be out of place. With the construction of the present invention, such a problem is securely prevented from occurring.

The electric wire having low bending stiffness may be a small-diameter electric wire and/or an electric wire including an insulating coating having low hardness, while the electric wire having high bending stiffness may be a large-diameter electric wire and/or an electric wire including an insulating coating having high hardness.

In the following, an electric junction box to be mounted on a vehicle such as a motor vehicle between a battery and electronic instruments, for supplying current from the battery to the various electronic instruments and controlling the electronic instruments, will be explained.

FIGS. 19-22 show preferred embodiments of an electric junction box according to the present invention.

In an electric junction box 510, an inner circuit is constructed by mounting an electric source block (electric component) 535, connector block 530, ECU, electric wires and ECU busbars therein. The electric junction box 510 is an electric connection part for supplying current from a battery to various motors as actuators and an outer circuit composed by meters.

In the electric source block (i.e. power supply block) 535 according to the preferred embodiment, fuses (not shown in the figure) and relay units 547 are assembled. The current is supplied from the battery to the electric source block 535 through a wiring harness (not shown in the figure), wherein the current flows to the relay unit 547 by way of the fuse and the relay unit 547 controls the actuators.

The junction box 510 according to the preferred embodiment, which provides an engaging structure that enables the electric source block 535 to be easily removed therefrom, includes: an inner cover (i.e. body) 512 having a block mount (mount for mounting a part) 522, and an electric source block 535 slidably mounted on the block mount 522, wherein an engaging projection (i.e. engaging part) 542 is projectingly formed on the electric source block 535 in the horizontal direction, while a flexible mating engaging piece (i.e. mating engaging part) 515 having a claw 515c to be engaged with the engaging projection 542 is projectingly formed on a base wall 513 of the inner cover 512 in the vertical direction. The mating engaging piece 515 includes a base 515a and a free end 515b leading to the base 515a, wherein the claw 515c is formed on the free end 515b. The inner cover 512 is provided with a back wall (i.e. rising wall) 522d located between the electric source block 535 and the mating engaging piece 515, wherein the back wall 522d is provided with a window 522f for allowing the engaging projection 542 of the electric source block 535 to pass therethrough from one side to an opposite side. The engaging projection 542 located on this side of the back wall 522d engages with the claw 515c located on the other side of the back wall 522d, thereby engaging the electric source block 535 with the inner cover 512.

In the following, the primary structure and action of the junction box 510 will be explained with reference to FIG. 22 and the other figures.

In this description, directions such as a front-and-rear direction x, left-and-right direction y and up-and-down direction z are defined as follows for convenience sake (see FIG. 22): the front-and-rear direction x being the direction along which the electric source block 535 is mounted on the inner cover 512, wherein the front being the side on which the electric source block 535 is situated while the rear side being the side on which wall 528 is situated; the left-and-right direction y being the direction along which the connector block 530 is mounted; and the up-and-down direction z being the thickness direction of the base wall 513 of the inner cover 512, wherein the up being the side on which the ECU busbar 534 is situated. In this connection, in an actual use of the electric junction box 510, for example, the up-and-down direction z may be inversely set or, alternatively, the front-and-rear direction x may become the left-and-right direction y, and vice versa.

Figure 22:
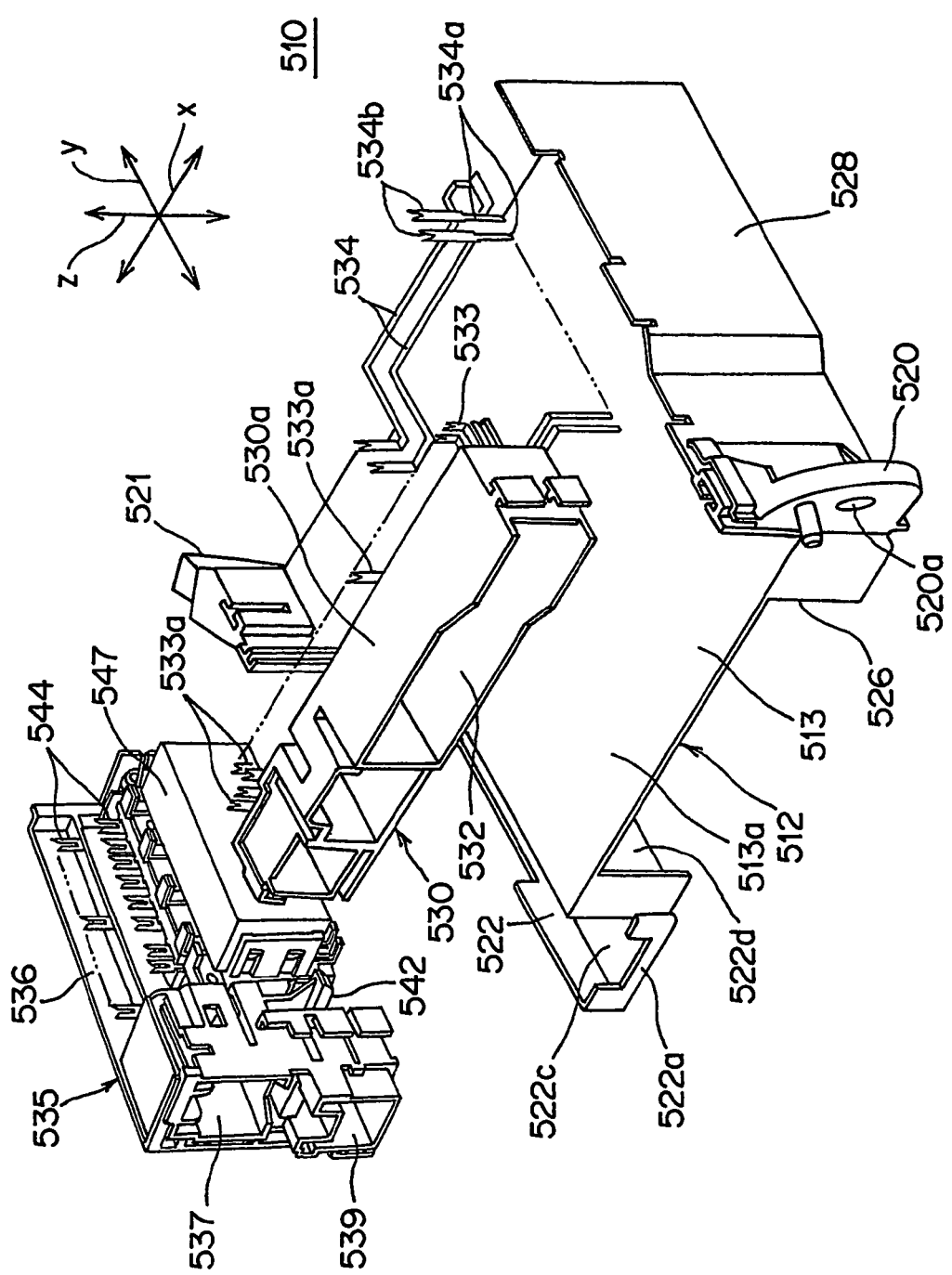
FIG. 22 is an exploded perspective view of the junction box.
Figure 23:
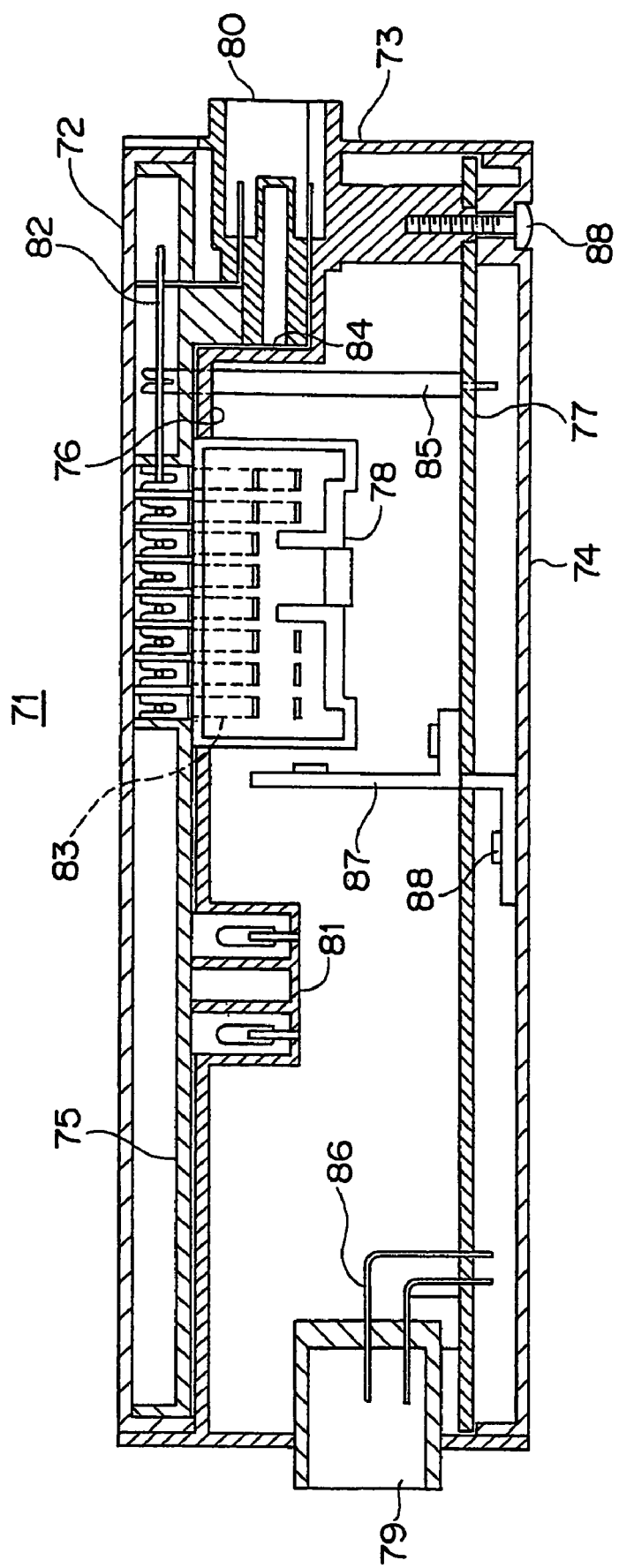
FIG. 23 is a longitudinal cross sectional view illustrating an example of a conventional junction block.

As shown in FIG. 22, the junction box 510 includes: an inner cover 512 having a plurality of block mounts 522, 526, 527 around; an electric source block 535 and connector block 530 to be mounted on the block mounts 522, 526, 527; an outer cover (not shown in the figure) and ECU cover (not shown in the figure) for covering the inner cover 512 from above and below; ECU busbars 534 and wiring unit (not shown in the figure) having a layer structure to be mounted between the inner cover 512 and outer cover; and an ECU (not shown in the figure) to be mounted between the inner cover 512 and the ECU cover.

The inner cover 512, which is formed in a rectangular shape by resin molding, includes a base wall 513, a plurality of the block mounts 522, 526, 527 formed around the base wall 513, side walls 528, 529 formed at ends of two sides crossing at right angles to each other of the base wall 513, and mounting brackets 520, 521 situated on a diagonal line of the base wall 513 leading to the corner. (see FIG. 19; the inner cover shown in FIG. 19 being reverse to the inner cover shown in FIG. 22 in the up-and-down direction) The upper face 513a and lower face 513b are formed open so as to mount a wiring unit and ECU. The wiring unit includes a wiring sheet, wiring board, bare electric wire and insulating sheet.

The upper face 513a of the base wall 513 is provided with a receiving groove (not shown in the figure) for keeping positioning of a plurality of the ECU busbars 534 and a through hole (not shown in the figure) for allowing a terminal part 534a formed bent downward to pass therethrough. A pressure welding part 534b formed bent upward of the ECU busbar 534 is allowed to pass through a through hole formed on a wiring board in the wiring unit.

The ECU busbar 534 is a conductor for electrically connecting the ECU to be mounted on the lower face 513b of the base wall 513 with the wiring unit to be mounted on the upper face 513a of the base wall 513. The ECU busbar 534 is formed bent after an electrically conductive plate is die-punched. A bare electric wire of the wiring unit is pressure-welded to the pressure welding part 534b and the terminal part 534a is connected to a female terminal of the ECU.

Figure 19:
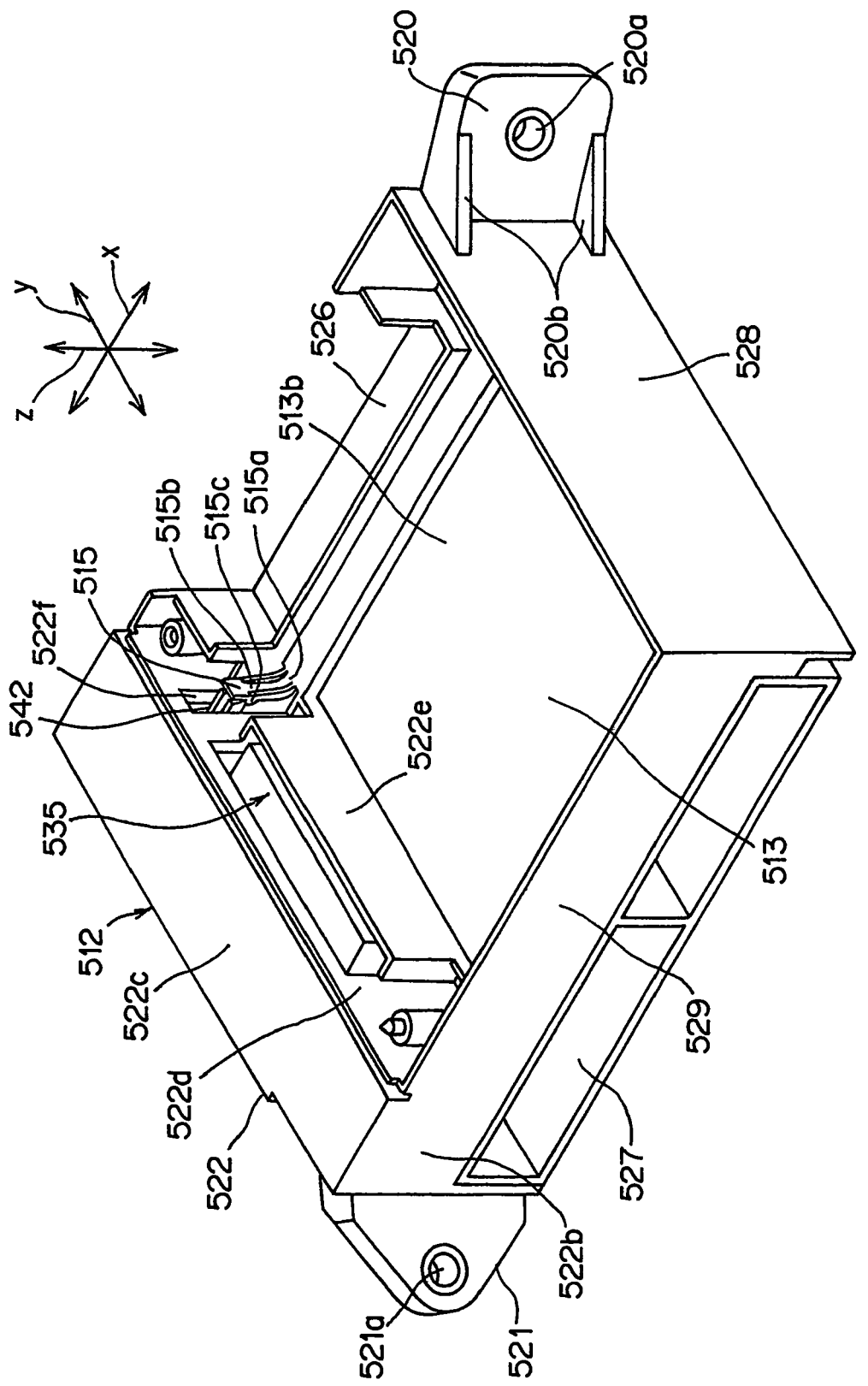
FIG. 19 is a perspective view illustrating a preferred embodiment of a primary part of an electric junction box according to the present invention.

As shown in FIG. 19, the ECU is mounted on the lower face 513b of the base wall 513. Since the ECU is surrounded by vertical walls 522d, 528 and 529 from the three directions, the ECU is protected from an external interference or water. The front wall 522d is the back wall 522d of the block mount 522, so that heat generated from a relay unit 547 of the electric source block 535 is prevented from flowing to the ECU. Since the ECU includes electronic components to be easily affected by heat, an error in operation of the ECU can be prevented from occurring because the back wall 522d obstructs heat to flow.

Figure 20:
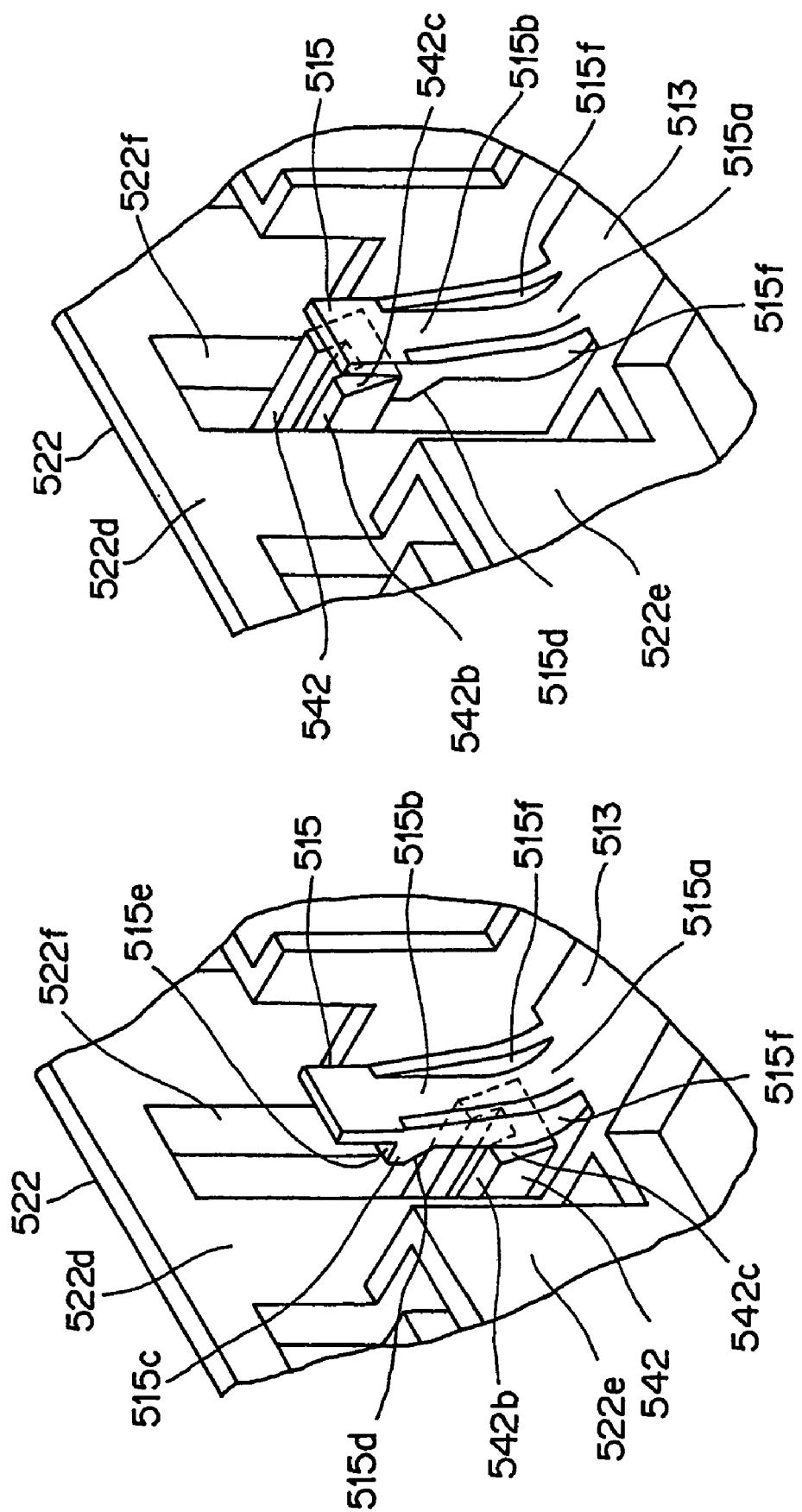
FIG. 20A is a perspective view illustrating a state before the engaging between an engaging projection (engaging part) and a mating engaging piece (mating engaging part) of the junction box shown in FIG. 19.
FIG. 20B is a perspective view illustrating a state after the engaging between an engaging projection (engaging part) and a mating engaging piece (mating engaging part) of the junction box shown in FIG. 19.

A mating engaging piece 515, which engages with an engaging projection 542 of the electric source-block 535, rises vertically from the lower face 513b, at a position facing a window 522f formed on the back wall 522d (see FIG. 20). The mating engaging piece 515 includes a base 515a leading to the base wall 513, a free end 515b having a claw 515c and leading to the base 515a, and ribs 515f situated at both sides for reinforcing the free end 515b so as to prevent an excess bending thereof. Therefore, The mating engaging piece 515 can suitably bent in a direction leaving from the engaging projection 542 around the base 515a. The engaging projection 542 can be easily engaged with the mating engaging piece 515, thereby improving the mounting characteristic of the electric source block 535. Further, by pushing an end of the mating engaging piece 515, the circumference of which is opened, with fingers, the engagement can be easily removed.

The claw 515c includes an inclined surface 515d on the side of the base 515a and a horizontal engaging surface 515e which leads to the inclined surface 515d. Therefore, when the electric source block 535 is mounted on the inner cover 512, the engaging projection 542 climbs along the inclined surface 515d of the claw 515c, the mating engaging piece 515 is bent in a direction leaving from the engaging projection 542, then the engaging projection 542 climbs over the inclined surface 515d, so that the mating engaging piece 515 is resiliently restored and the engaging projection 542 engages with the mating engaging piece 515.

As shown in FIG. 19, the front block mount 522, to which the electric source block 535 is mounted, includes vertical walls 522a, 522b situated left and right, horizontal wall 522c leading to these vertical walls 522a, 522b, and back wall 522d. A projecting part 522e is formed at the center of the back wall 522d. The projecting part 522e receives a relay unit 547 of the electric source block 535. The back wall 522d is provided with a window 522f formed thin and long in the up-and-down direction for allowing the engaging projection 542 of the electric source block 535 to pass therethrough from this side (front side) to the opposite side (back side). The window 522f is formed in a slot-shape in the up-and-down direction. When the electric source block 535 is mounted on the block mount 522, the engaging projection 542 slides in the window 522f and engages with the mating engaging piece 515 rising up from the base wall 513, facing to the window 522f.

Block mounts 526, 527 for mounting the connector blocks 530 (only one connector block being shown in FIG. 22) are formed on the circumference situated left and right. The connector block 530 includes a fitting space 532 corresponding to a mating male connector (not shown in the figure) inside a circumferential wall 530a. A plurality of terminal parts of the pressure welding terminals 533 are protruded in parallel in the fitting space 532. The pressure welding part 533a leading to the terminal part is guided out from the back side of the connector block 530 and bent upward.

Since the electric source block 535 and connector block 530 are mounted to the circumference of the inner cover 512 in the lateral direction, a space can be effectively utilized and the junction box 510 is prevented from enlarging in the up-and-down direction. Therefore, for example, the junction box 510 can be mounted even in a narrow space where various parts are crowded around an engine room or instrument panel.

Each mounting bracket 520, 521 includes a hole 520a, 521a for allowing a fastening bolt to pass therethrough on its center so as to be fixed to a vehicle body or the like. Since the root part of the bracket 520, 521 is reinforced by a rib 520b, the root part is prevented from abruptly being broken.

As shown in FIG. 21, the electric source block 535 includes a fuse plate 536, a plurality of busbars 544, wiring board 545, relay unit 547 and fuses (not shown in the figure). The fuse is connected to the relay unit 547 through the busbar 544, thereby constructing an inner circuit of the electric source block 535.

The fuse plate is formed by molding resin and includes two connector cavities 537 and 539 and busbar mount 541 on the upper surface, and fuse mount (not shown in the figure) on the lower surface.

The connector cavities 537 and 539 are formed at ends of the fuse plate 536. The outer frame of the connector cavity 537, 539 having a rectangular box-shape is formed with circumferential walls 537a, 539a and an inner wall. The inside of the connector cavity 537, 539 is a connector fitting chamber 538, 540. An upper circumferential wall of each connector cavity 537, 539 is provided with a corresponding slit 537b, 539b for mounting a busbar (not shown in the figure) in the longitudinal posture thereof for supplying electric power. A plate-shaped terminal part integrally formed on the busbar for supplying electric power is inserted into the slit 537b, 539b and protruded in the connector fitting chamber 538, 540. A connector (not shown in the figure) of a wiring harness, which is connected to a positive electrode and a negative electrode, is fitted into the connector-fitting chamber 538, 540, and a female terminal is connected to the plate-shaped terminal part so that the current from the battery is supplied to the electric source block 535.

The busbar mount 541 includes a plurality of slot-shaped grooves, into which the busbar for supplying power having a plurality of tuning fork-shaped parts in parallel on one side and a tab-shaped terminal part on the other side and a busbar 544 for branching having a pressure welding part 544a on one side and a tuning fork-shaped part on the other side are mounted. The busbar 544 is made by punching out from a conductive plate and bending according to needs. The pressure welding part 544a (shown in the figure) is a terminal for connecting electric wires having a pair of pressure welding pieces. A fuse terminal is connected to the tuning fork-shaped part (not shown in the figure).

The busbar 544 for branching is mounted in a manner that it makes a laminated structure on and under the wiring board 545. The wiring board 545 is made by injection-molding insulating resin material and is provided with grooves (not shown in the figure) for receiving the busbar 544 on both upper and lower surfaces thereof. A short circuit between the upper busbar 544 and the lower busbar 544 is prevented by the wiring board 545. The pressure welding parts 544a adjacent to each other is prevented from making a short circuit by being received in the respective busbar grooves 544.

The engaging projection 542 for engaging with the mating engaging piece 515 of the inner cover 512 is integrally formed with the fuse plate 536 between the connector cavity 537, 539 and the busbar mount 541. A plurality of engaging means for mounting the electric source block 535 to the inner cover 512 are provided besides the engaging projection 542, but in FIG. 21 only the engaging projection 542 is shown.

The engaging projection 542 is located crossing the mating engaging piece 515 at right angles (FIG. 20) and formed rising up vertically from the fuse plate 536. The engaging projection 542 includes the base 542a leading to the fuse plate 536, the free end 542b leading to the base 542a having the inclined surface 542a at the end thereof, and the rib 542d for reinforcing the free end 542b. Since the rib 542d is formed from the root to the end of the free end 542b, the free end 542b is reinforced over the whole length thereof, thereby preventing a damage from occurring during the mounting of the electric source block 535, the damage being that the engaging projection 542 abuts against the mating engaging piece 515 and is broken, for example.

The inclined surface 542c of the engaging projection 542 has about the same inclining angle as that of the inclined surface 515d of the claw 515c of the mating inclined piece 515. During the mounting of the electric source block 535, the inclined surface 542c slides against the inclined surface 515d, thereby the engagement between the engaging projection and the mating engaging piece can be carried out smoothly.

The relay unit 547 is mounted on the fuse plate 536 through a relay plate 546 made of resin material. The relay unit 547 receives four relays. Each relay includes a relay body consisting of an electromagnetic coil and a contact member, and four input and/or output terminals guided out from the electromagnetic coil and contact member. FIG. 21 shows input terminals 548a, 548b, 548c, 548d to be resistance-welded to the terminal part 544b of the uppermost layer busbar for branching. The terminal part 544b of the busbar is connected to the respective four terminals of the relays, thereby the relay is connected to a fuse and the current from the battery is supplied to the relay.

As described above, according to the preferred embodiment, when the electric source block 535 is mounted on the inner cover 512, the engaging projection 542 is guided through the window 522f and abuts against the claw 515c, then the mating engaging piece 515 is bent in the direction leaving from the engaging projection 542 and then the engaging projection 542 engages with the claw 515c after climbing over the claw 515c, thereby the electric source block 535 is engaged with the inner cover 512. When the mating engaging piece 515 being exposed to the outside of the electric source block 535 is bent in a state that the electric source block 535 is engaged, the engagement between the engaging projection and the claw 515c is removed and the electric source block 535 is easily removed from the inner cover 512.

The block mount 522 formed on the inner cover 512 is provided with the back wall 522d so that heat generated from the relay unit 547 and so on does not flow into the ECU. However, the back wall 522d may be removed unless there is a problem as to water or heat.

The aforementioned preferred embodiments are described to aid in understanding the present invention and variations may be made by one skilled in the art without departing from the spirit and scope of the present invention.

That is, the electric junction box including:

a body; and an electric component to be mounted on the body, wherein an engaging part is projectingly formed on the electric component in the horizontal direction, while a mating engaging part having a claw to be engaged with the engaging part of the electric component is projectingly formed on a base wall of the body in the vertical direction.

With the construction described above, making the engaging part projectingly in the horizontal direction face to the mating projecting part projectingly in the vertical direction, when the electric component is slid in the direction along which the mating engaging part projects, the engaging part abuts against the claw so as to bend the mating engaging part, and the engaging part engages with the claw after climbing thereover, so that the electric component is engaged with the body of the junction box. When the mating engaging part is bent in a state that the electric component is engaged with the body of the junction box, the engagement between the engaging part and the claw is removed, so that the electric component is removed from the body.

The mating engaging part of the body may include a base and a free end leading to the base, wherein the claw is formed on the free end.

With the construction described above, the mating engaging part is easily bent in a direction, along which the mating engaging part leaves the engaging part, around the base. Further, a structure of the mating engaging part becomes simple.

The body may be provided with a rising wall located between the electric component and the mating engaging part of the body, wherein the rising wall is provided with a window for allowing the engaging part of the electric component to pass therethrough from one side to an opposite side.

With the construction described above, the engaging part can be engaged with the mating engaging part located on the opposite side of the rising wall. Further, the mating engaging part located on the opposite side of the rising wall can be bent with fingers, for example. Further, for example, the electric component can be mounted in one chamber of two adjacent chambers partitioned by the rising wall while the mating engaging part can be mounted in another chamber. When the another chamber is opened as parts being removed, the mating engaging part is exposed, so that an operation for removing the engagement can be easily carried out.

The claw may include an inclined surface and a horizontal engaging surface which leads to the inclined surface.

With the construction described above, when the engaging part of the electric component climbs on the inclined surface of the claw, the mating engaging part is bent, so that the electric component can be smoothly slid. When the engaging part climbs over the inclined surface of the claw, the engaging part abuts against the horizontal engaging surface of the claw, so that the electric component is engaged.

The electric component may be mounted on the side of the body.

With the construction described above, a space around the body of the junction box can be effectively utilized, so that a structure of the junction box can be simple. Therefore, the junction box can be mounted in a narrow space where parts to be mounted on a vehicle are crowded.

INDUSTRIAL APPLICABILITY

According to the present invention described in claim 1, since the outer circumference is surrounded by the connector blocks and the power block, a conventional case or cover for covering the outer circumference becomes unnecessary. Further, since the busbars and the wiring module are tightly received within the inside space surrounded by the connector blocks and the power block without leaving a practical gap, the structure of the junction block can be simple, compact and dense, thereby enabling easy assembling into a narrow space in a vehicle or the like. Since the respective components can be assembled by using the inner cover as the assembly base, the assembling work can be easily efficiently carried out, thereby attaining cost-down in parts due to the simplification of the structure and cost-down in the assembly.

According to the present invention described in claim 2, since the random wiring module is mixed (piled up) with the cross wiring module, thereby enabling various designing for a circuit form and increasing in the circuit density and in the degree of freedom for circuit designing.

According to the present invention described in claim 3, since the terminals of the busbars are connected to the wires at the middle of the random wiring module, the degree of freedom for connecting positions of the terminals with respect to the wires increases, thereby enabling various designing for a circuit form.

According to the present invention described in claim 4, since the wiring modules situated on the upper and lower layers can be effectively connected to the respective terminals, thereby saving a space required for the connecting parts and promoting the miniaturization and densification of the junction block.

According to the present invention described in claim 5, the pressure welding terminals make the connection of the wiring module to the wires easy, thereby saving a space required for the connecting parts, decreasing in assembling man-hour, and promoting the miniaturization and densification of the junction block.

According to the present invention described in claim 6, a large relay is situated, for example, in a space surrounded by the power block and the connector blocks on the inner cover, thereby enabling to use the inside space effectively and promoting the miniaturization and densification of the junction block.

According to the present invention described in claim 7, since the electronic unit is situated on the reverse side with respect to the connector blocks and wiring module, the electronic unit can be arranged with the connector blocks and wiring module in a space-saving manner, thereby promoting the miniaturization and densification of the junction block.

According to the present invention described in claim 8, the connector blocks and the power block can be easily assembled to the inner cover in a slide-fitting manner from one direction. Therefore, the assembling man-hour of the junction block can be decreased, the connector blocks and the power block can be tightly combined with each other relatively to the inner cover without a practical gap, and the miniaturization and densification of the junction block can be promoted.

According to the present invention described in claim 9, a conventional box-shaped cover becomes unnecessary so that the structure of the junction block becomes simple. The respective components such as the power block and the connector blocks are combined with one another, thereby the junction block can be assembled easily in a space-saving manner. The compact junction block can be produced at low cost.

According to the present invention described in claim 10, the power block and the connector blocks are slidingly assembled to the inner cover in one direction, thereby making the assembling of the junction block easy.

According to the present invention described in claim 11, the inner cover is combined with and fixed to the power block through the connector blocks, thereby improving the strength of the assembled body, that is, improving the strength of the junction block. Therefore, the quality of the junction block can be secured excellently even if there is an undesired external force during shipping or vibration during travelling of a vehicle.

According to the present invention described in claim 12, the assembled structure is made in a space-saving manner, thereby enabling decrease in the size of the junction block.

According to the present invention described in claim 13, for example, a dead space situated on the side of the engaging portion of a connector can be effectively used as a space for the combination, thereby the assembled structure can be made in a space-saving manner.

According to the present invention described in claim 14, the stiffness of the slide-engaging part is improved and the strength of the assembled structure increases. Since the outside wall covers the guide part into which the rib enters, dust is prevented from entering into a connector, thereby securing the reliability of the electric connection of the connector.

According to the present invention described in claim 15, the strength of the junction block can be improved, therefore the quality of the junction block can be secured excellently even if there is an undesired external force during mounting of the junction block to a vehicle or vibration during travelling of a vehicle.

The invention claimed is:

1. A junction block comprising:
   an inner cover;
   connector blocks and a power block disposed outside the inner cover; and
   busbars and a wiring module disposed being piled up within a space surrounded by the connector blocks and the power block, wherein terminals of the connector blocks, terminals of the power block and terminals of the busbars are connected to the wiring module, and the wiring module consists of a random wiring module and a cross wiring module.

2. The junction block according to claim 1, wherein the terminals are connected to ends of the wiring modules and part of the terminals of the busbars are connected to a middle part of the random wiring module situated as a lower layer in the space.

3. The junction block as claimed in claim 1, wherein the terminals of the connector blocks and/or the terminals of the power block and/or the terminals of the busbars are pressure welding terminals.

4. The junction block as claimed in claim 1, wherein an electronic unit is mounted on a back of the inner cover and connected to terminals arranged on the back of the busbars.

5. The junction block as claimed in claim 1, wherein the inner cover, the connector blocks and the power block are slidingly combined.

6. A junction block comprising:
an inner cover;
connector blocks and a power block disposed outside the inner cover; and
busbars and a wiring module disposed being piled up within a space surrounded by the connector blocks and the power block, wherein
terminals of the connector blocks, terminals of the power block and terminals of the busbars are connected to the wiring module, and
the terminals of the connector blocks and/or the terminals of the power block are arranged in a plurality of steps, wherein the terminals arranged in a lower step are connected to a narrow lower wiring module while the terminals arranged in an upper step are connected to a wide upper wiring module.

7. The junction block as claimed in claim 6, wherein the terminals of the connector blocks and/or the terminals of the power block and/or the terminals of the busbars are pressure welding terminals.

8. The junction block as claimed in claim 6, wherein an electronic unit is mounted on the a back of the inner cover and connected to terminals arranged on a back of the busbars.

9. The junction block as claimed in claim 6, wherein the inner cover, the connector blocks and the power block are slidingly combined.

10. A junction block comprising:
an inner cover;
connector blocks and a power block disposed outside the inner cover; and
busbars and a wiring module disposed being piled up within a space surrounded by the connector blocks and the power block, wherein
terminals of the connector blocks, terminals of the power block and terminals of the busbars are connected to the wiring module, and
the power black includes fuses outside and a relay inside.

11. A junction block comprising:
an inner cover having a horizontal plate and vertical walls crossing the horizontal plate; and
a power block and connector blocks combined with the inner cover, wherein components such as circuit boards are disposed and connected within a space surrounded by the power block and the connector blocks, wherein
the power block and the connector blocks form at least a part of the outside of the junction block,
wherein the combination of the power block and the connector blocks with the inner cover is carried out by engaging a slide-engaging part with a guide part in a direction crossing the horizontal plate of the inner cover at right angles.

12. The junction block as claimed in claim 11, further comprising engaging parts for engaging the power block and the connector blocks with the inner cover and a mount on the inner cover, and such engaging is carried out in the vicinity of the mount of the inner cover.

13. A junction block comprising:
an inner cover having a horizontal plate and vertical wall crossing the horizontal plate; and
a power block and connector blocks combined with the inner cover, wherein
components such as circuit boards are disposed and connected within a space surrounded by the power block and the connector blocks,
the power block and the connector blocks form at least a part of the outside of the junction block,
the combination of the power block and the connector blocks with the inner cover is carried out by engaging a slide-engaging part wit a guide part in a direction crossing the horizontal plate of the inner cover at right angles; and
one of the connector blocks is combined with the inner cover, while the other connector block is combined with the power block.

14. A junction block comprising:
an inner cover having a horizontal plate and vertical walls crossing the horizontal plate; and
a power block and connector blocks combined with the inner cover, wherein components such as circuit boards are disposed and connected within a space surrounded by the power block and the connector blocks, wherein the power block and the connector blocks form at least a part of the outside of the junction block,
wherein the combination of the power block and the connector blocks wit the inner cover is carried out by engaging a slide-engaging part of the connector block or the power block into an engaging hole which communicates with a dead space in the power block or the connector block, respectively, in a direction crossing the horizontal plate of the inner cover at right angles.

15. The junction block according to claim 14, wherein the dead space is within a connector.

16. A junction block comprising:
an inner cover; and
a power block and connector blocks combined with the inner cover, wherein
components such as circuit boards are disposed and connected within a space surrounded by the power block and the connect or blocks,
the power block and the connector blocks form the outside of the junction block;
the slide-engaging part of the connector block or the power block enters into a dead space in the power block or the connector block, respectively; and
a slide-engaging part that enters into the dead space consists of a rib and an outside wall that covers an end and the front of the rib.

* * * * *